US012637379B2

(12) United States Patent
Kim et al.

(10) Patent No.: US 12,637,379 B2
(45) Date of Patent: May 26, 2026

(54) SUPPORT STRUCTURES FOR ACCOMMODATING THERMAL EXPANSION AND GLASS MANUFACTURING APPARATUSES COMPRISING THE SAME

(71) Applicant: CORNING INCORPORATED, Corning, NY (US)

(72) Inventors: JinSoo Kim, Corning, NY (US); Eric Lee Miller, Corning, NY (US); Brian Michael Palmer, Corning, NY (US); Tytus Lee Zimmerman, Columbia Cross Roads, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/551,115

(22) PCT Filed: May 9, 2022

(86) PCT No.: PCT/US2022/028254
§ 371 (c)(1),
(2) Date: Sep. 18, 2023

(87) PCT Pub. No.: WO2022/240709
PCT Pub. Date: Nov. 17, 2022

(65) Prior Publication Data
US 2024/0190748 A1 Jun. 13, 2024

Related U.S. Application Data

(60) Provisional application No. 63/188,191, filed on May 13, 2021.

(51) Int. Cl.
*C03B 5/16* (2006.01)
*C03B 5/167* (2006.01)
(Continued)

(52) U.S. Cl.
CPC ................ *C03B 5/167* (2013.01); *C03B 7/02* (2013.01); *C03B 7/08* (2013.01); *C03B 17/064* (2013.01)

(58) Field of Classification Search
CPC ......... C03B 7/092; C03B 7/088; C03B 7/084; C03B 7/02; C03B 5/1875; C03B 5/187; C03B 5/18; C03B 5/1675; C03B 5/167
See application file for complete search history.

(56) References Cited

U.S. PATENT DOCUMENTS 3,754,886 A * 8/1973 Richards ............... C03B 5/2255
65/180
4,689,009 A 8/1987 Heuss
(Continued)

FOREIGN PATENT DOCUMENTS

CN 1334253 A 2/2002
CN 203498246 U 3/2014
(Continued)

OTHER PUBLICATIONS

Japanese Patent Application No. 2023-570214, Office Action dated Dec. 26, 2024, 2 pages (English Translation only), Japanese Patent Office.
(Continued)

*Primary Examiner* — Matthew J Daniels
(74) *Attorney, Agent, or Firm* — Kevin M. Able; F. Brock Riggs

(57) ABSTRACT
A glass manufacturing apparatus includes a stir chamber disposed on a base. The stir chamber includes an entry port attached to a first connector tube, a chamber conduit, and an elbow conduit. The apparatus also includes a second connector tube connected to the elbow conduit to deliver molten glass therefrom. At least a portion of the second connector tube extends at least partially upward in the vertical direction. The apparatus also includes a delivery vessel connected
(Continued)

to the second connector tube. One of the base or the delivery vessel is attached to a reference point that is fixed in the vertical direction. The other one of the base or the delivery vessel is movable in response to thermal expansion of the second connector tube, which is independent of thermal expansion of the other one of the base or the delivery vessel.

11 Claims, 9 Drawing Sheets

(51) Int. Cl.
C03B 7/02 (2006.01)
C03B 7/08 (2006.01)
C03B 17/06 (2006.01)

(56) References Cited

U.S. PATENT DOCUMENTS

| | | | |
|---|---|---|---|
| 5,851,258 A | 12/1998 | Ando et al. | |
| 6,286,337 B1 | 9/2001 | Palmquist | |
| 8,240,170 B2 | 8/2012 | De et al. | |
| 8,499,584 B2 | 8/2013 | Pitbladdo | |
| 8,978,419 B2 * | 3/2015 | De Angelis | C03B 5/16 |
| | | | 65/135.4 |
| 9,062,772 B2 | 6/2015 | De Angelis et al. | |
| 9,242,886 B2 | 1/2016 | Bergman et al. | |
| 9,586,846 B2 | 3/2017 | Hwang et al. | |
| 9,725,349 B2 | 8/2017 | Demirbas et al. | |
| 10,538,449 B2 | 1/2020 | De Angelis et al. | |
| 2006/0042318 A1 | 3/2006 | Burdette et al. | |
| 2008/0083250 A1 | 4/2008 | Nagno et al. | |
| 2008/0142510 A1 | 6/2008 | Clark et al. | |
| 2011/0203321 A1 * | 8/2011 | De Angelis | C03B 5/167 |
| | | | 65/45 |
| 2012/0125051 A1 * | 5/2012 | Bergman | C03B 7/02 |
| | | | 65/324 |
| 2016/0115067 A1 * | 4/2016 | De Angelis | C03B 5/18 |
| | | | 65/195 |
| 2016/0297701 A1 | 10/2016 | Hwang et al. | |
| 2021/0032148 A1 | 2/2021 | Howles et al. | |

FOREIGN PATENT DOCUMENTS

| | | |
|---|---|---|
| CN | 102583957 B | 7/2014 |
| CN | 105502889 A | 4/2016 |
| CN | 106277717 A | 1/2017 |
| CN | 208055183 U | 11/2018 |
| CN | 111491899 A | 8/2020 |
| CN | 111511694 A | 8/2020 |
| CN | 111902373 A | 11/2020 |
| JP | 06-272926 A | 9/1994 |
| JP | 08-301620 A | 11/1996 |
| JP | 09-072994 A | 3/1997 |
| JP | 09-188526 A | 7/1997 |
| JP | 2006-315894 A | 11/2006 |
| JP | 2012-111687 A | 6/2012 |
| JP | 2013-216535 A | 10/2013 |
| JP | 2014-069983 A | 4/2014 |
| WO | 2005/110934 A2 | 11/2005 |
| WO | 2007/013228 A1 | 2/2007 |
| WO | 2010/067669 A1 | 6/2010 |
| WO | 2013/011927 A1 | 1/2013 |
| WO | 2018/081772 A1 | 5/2018 |
| WO | 2019/113287 A1 | 6/2019 |
| WO | 2019/146446 A1 | 8/2019 |
| WO | 2019/165402 A1 | 8/2019 |
| WO | 2020/068570 A1 | 4/2020 |
| WO | 2020/068750 A1 | 4/2020 |

OTHER PUBLICATIONS

International Search Report and Written Opinion of the International Searching Authority; PCT/US2022/028254; dated Aug. 26, 2022; 9 pages; European Patent Office.
Chinese Patent Application No. 202280044006.1 , Office Action dated Aug. 22, 2025, 4 pages (English Translation only), Chinese Patent Office.
Taiwanese Patent Application No. 111117623 , Office Action dated Sep. 24, 2025, 2 pages (English Translation only), Taiwanese Patent Office.

* cited by examiner

SUPPORT STRUCTURES FOR ACCOMMODATING THERMAL EXPANSION AND GLASS MANUFACTURING APPARATUSES COMPRISING THE SAME

CROSS-REFERENCE TO RELATED APPLICATIONS

This is a national stage application under 35 U.S.C. § 371 of International Application No. PCT/US2022/028254, filed on May 9, 2022, which claims the benefits of priority under 35 U.S.C. § 119 of U.S. Provisional Application Ser. No. 63/188,191 filed on May 13, 2021, the content of which is relied upon and incorporated herein by reference in their entireties.

FIELD

The present specification relates to glass manufacturing apparatuses and, more particularly, to glass manufacturing apparatuses with support structures for accommodating thermal expansion of molten glass delivery vessels.

TECHNICAL BACKGROUND

Glass manufacturing apparatuses can include a variety of discrete components for melting, processing, and forming glass. For example, a typical glass manufacturing apparatus may include, among other components, a melter for melting a batch of glass constituent components to form a molten material precursor (e.g., molten glass), a fining system for removing dissolved gasses from the molten glass, a stir chamber for homogenizing the molten glass, and a forming apparatus for forming the molten glass into a desired shape (e.g., a ribbon, cylinders, tubes, etc.). The components of the glass manufacturing apparatus may be connected through a plurality of connector tubes through which the molten glass flows from one component to the next. The connector tubes may be formed from refractory metals, such as platinum, platinum alloys, and the like, to withstand the relatively high temperatures and corrosive nature of the molten glass.

The components of the glass manufacturing apparatus may be subjected to high temperatures for extended periods. Cycling between room temperature conditions and the high temperature operating conditions of the glass manufacturing apparatus may introduce stresses to the components of the glass manufacturing apparatus. Regular and continuous introduction of stresses to the components of the glass manufacturing apparatus may lead to premature failure of the components. Further, increasing the throughput of molten glass through the glass manufacturing apparatus may necessitate the use of higher temperatures to ensure proper flow of the molten glass through the glass manufacturing apparatus. Higher operating temperatures may further increase the stresses introduced in the components of the glass manufacturing apparatus and, in turn, reduce the service life of the components.

SUMMARY

A first aspect of the present disclosure includes a glass manufacturing apparatus comprising a first assembly. The first assembly comprises a first connector tube for receiving molten glass and a stir chamber disposed on a base, the stir chamber comprises an entry port attached to the first connector tube; a chamber conduit extending at least partially downward in a vertical direction away from the entry port;

and an elbow conduit comprising a first portion in fluid communication with the chamber conduit to receive molten glass therefrom and a second portion extending at an angle from the vertical direction to re-direct the molten glass flowing from the chamber conduit. The glass manufacturing apparatus also includes a second assembly comprising a second connector tube connected to the elbow conduit to deliver molten glass therefrom, wherein at least a portion of the second connector tube extends at least partially upward in the vertical direction; and a delivery vessel connected to the second connector tube One of the base or the delivery vessel is attached to a reference point that is fixed in the vertical direction. The other one of the base or the delivery vessel is movable in response to thermal expansion of the second connector tube. Movement of the other one of the base or the delivery vessel responsive to thermal expansion of the second connector tube is independent of thermal expansion of the other one of the base or the delivery vessel.

A second aspect of the present disclosure includes a glass manufacturing apparatus according to the first aspect, further comprising a support system in mechanical contact with the one of the base or the delivery vessel that is attached to the reference point, the support system counteracting a gravitational load associated with the one of the base or the delivery vessel to facilitate vertical expansion thereof away from the reference point upon heating.

A third aspect of the present disclosure includes a glass manufacturing apparatus according to any of the first through the second aspects, further comprising a support structure attached to the reference point and structurally supporting the one of the base or the delivery vessel, wherein the support system comprises one or more spring assemblies extending between the one of the base or the delivery vessel and a support structure attached to the reference point.

A fourth aspect of the present disclosure includes a glass manufacturing apparatus according to any of the first through the third aspects, wherein: the delivery vessel is fixedly attached to the reference point, and the glass manufacturing apparatus further comprises: a stir chamber support cart extending in a horizontal direction between the second assembly and the first assembly, a stir chamber support frame extending vertically from the base, the stir chamber support frame structurally supporting the stir chamber, and one or more sliding joints coupling the stir chamber support frame to the stir chamber support cart such that the base moves in the vertical direction relative to the stir chamber support cart with expansion of the stir chamber.

A fifth aspect of the present disclosure includes a glass manufacturing apparatus according to any of the first through the fourth aspects, further comprising a system configured to negate a weight of the stir chamber and permit vertical expansion of the stir chamber via application of a force to the stir chamber.

A sixth aspect of the present disclosure includes a glass manufacturing apparatus according to any of the first through the fifth aspects, wherein the system comprises a weight coupled to a pivot arm coupled to the stir chamber support cart.

A seventh aspect of the present disclosure includes a glass manufacturing apparatus according to any of the first through the sixth aspects, wherein: the stir chamber support frame comprises a plurality of support arms connected to the base, the glass manufacturing apparatus further comprises a plurality of sliding joints coupling the stir chamber support frame to the stir chamber support cart, each of the plurality of sliding joints comprises a support sleeve attached to the stir chamber support cart, and each of the support sleeves is slidably coupled to one of the plurality of support arms.

An eighth aspect of the present disclosure includes a glass manufacturing apparatus according to any of the first through the seventh aspects, wherein the system comprises a plurality of mass compensation members coupled to the plurality of support arms of the stir chamber support frame.

A ninth aspect of the present disclosure includes a glass manufacturing apparatus according to any of the first through the eighth aspects, wherein the plurality of mass compensation members comprise spring assemblies placing an elastic force on the stir chamber support frame in the vertical direction.

A tenth aspect of the present disclosure includes a glass manufacturing apparatus according to any of the first through the ninth aspects, wherein the stir chamber comprises: a metallic vessel forming the chamber conduit and the elbow conduit; and a retainer structure encapsulating the metallic vessel.

An eleventh aspect of the present disclosure includes a glass manufacturing apparatus according to any of the first through the tenth aspects, wherein: the metallic vessel comprises a flange disposed at an upper end of the stir chamber opposite the elbow conduit, the stir chamber further comprises a plurality of flange extensions extending outward from the flange, and the plurality of flange extensions are connected to the reference point.

A twelfth aspect of the present disclosure includes a glass manufacturing apparatus according to any of the first through the eleventh aspects, further comprising a plurality of expansion assists extending between the plurality of flange extensions and a support structure coupled to the first assembly, the plurality of expansion assists applying an upward force to the flange to assist expansion of a portion of the stir chamber.

A thirteenth aspect of the present disclosure includes a glass manufacturing apparatus according to any of the first through the twelfth aspects, wherein the stir chamber further comprises a refractory body surrounding the metallic vessel, the refractory body extending between the metallic vessel and the retainer structure.

A fourteenth aspect of the present disclosure includes a glass manufacturing apparatus according to any of the first through the thirteenth aspects, wherein the retainer structure comprises: a plurality of circumferential segments surrounding the metallic vessel; a plurality of pressure bolt assemblies compressing the metallic vessel in a radially inward direction; and a plurality of tension spring assemblies applying circumferential tension to the plurality of circumferential segments.

A fifteenth aspect of the present disclosure includes a glass manufacturing apparatus according to any of the first through the fourteenth aspects, wherein the plurality of tension spring assemblies and the plurality of pressure bolts are disposed in a circumferentially alternating arrangement and configured to damp strain accumulation within the metallic vessel from thermal expansion of the second connector tube.

A sixteenth aspect of the present disclosure includes a glass manufacturing apparatus according to any of the first through the fifteenth aspects, wherein the second connector tube comprises a flow axis extending in a third direction forming a non-zero acute angle with the vertical direction towards the delivery vessel.

A seventeenth aspect of the present disclosure includes a glass manufacturing apparatus according to any of the first through the sixteenth aspects, wherein the second assembly comprises a plurality of support modules extending around segments of the second connector tube between the elbow conduit and the delivery vessel, the plurality of support modules each comprising a support frame.

A eighteenth aspect of the present disclosure includes a glass manufacturing apparatus according to any of the first through the seventeenth aspects, wherein the support frames of successive ones of the plurality of support modules are coupled to one another via a plurality of sliding joints such that ends of the plurality of support modules move along the flow axis of the second connector tube upon thermal expansion of the second connector tube.

A nineteenth aspect of the present disclosure includes a glass manufacturing apparatus according to any of the first through the eighteenth aspects, further comprising an expansion assist assembly extending between the support frames of the successive ones of the plurality of support modules, the expansion assist assembly comprising a spring applying an elastic force to the support frames along the flow axis of the second connector tube.

A twentieth aspect of the present disclosure includes a glass manufacturing apparatus according to any of the first through the nineteenth aspects, wherein the expansion assist assembly is disposed at an end of the second assembly proximate the delivery vessel.

A twenty-first aspect of the present disclosure includes a glass manufacturing apparatus comprising: a first assembly comprising a first connector tube for delivering molten glass from the fining vessel and a stir chamber disposed on a base. The stir chamber comprises: an entry port attached to the first connector tube; a chamber conduit extending downward in a vertical direction away from the entry port, the chamber conduit comprising a central axis; and an elbow conduit connected to the chamber conduit and re-directing the molten glass in a second direction. The glass manufacturing device also comprises a stir chamber support frame attached to the base, the stir chamber support frame comprising a plurality of stir chamber supports; a second assembly comprising a second connector tube connected to the elbow conduit to a delivery vessel that is vertically fixed, wherein at least a portion of the second connector tube extends vertically upward along a flow axis; and a stir chamber support cart extending between the first assembly and the second assembly. The stir chamber support cart is connected to the stir chamber supports via a plurality of sliding joints such that the stir chamber support frame moves relative to the stir chamber support cart in the vertical direction upon thermal expansion of the stir chamber.

A twenty-second aspect of the present disclosure includes a glass manufacturing apparatus according to the twenty-first aspect, wherein: the stir chamber support frame comprises a plurality of support arms extending vertically upward from the base, the stir chamber support cart comprises a plurality of support sleeves, each of the plurality of support arms extends through one of the plurality of support sleeves, and the sliding joints are disposed between the pluralities of support sleeves and support arms.

A twenty-third aspect of the present disclosure includes a glass manufacturing apparatus according to any of the twenty-first through the twenty-second aspects, further comprising a plurality of mass compensation members coupled to the plurality of support arms of the stir chamber support frame, the mass compensation members applying a force to the stir chamber upwardly in the vertical direction.

A twenty-fourth aspect of the present disclosure includes a glass manufacturing apparatus according to any of the twenty-first through the twenty-third aspects, wherein the plurality of mass compensation members comprise a plurality of spring members.

A twenty-fifth aspect of the present disclosure includes a glass manufacturing apparatus according to any of the twenty-first through the twenty-fourth aspects, wherein the plurality of mass compensation members comprise a plurality of hydraulic cylinders.

A twenty-sixth aspect of the present disclosure includes a glass manufacturing apparatus according to any of the twenty-first through the twenty-fifth aspects, wherein the stir chamber support cart is attached to the stir chamber via a support bracket at the entry port.

A twenty-seventh aspect of the present disclosure includes a glass manufacturing apparatus according to any of the twenty-first through the twenty-sixth aspects, wherein the entry port comprises a neutral point of expansion of the stir chamber that remains fixed in the vertical direction.

A twenty-eighth aspect of the present disclosure includes a glass manufacturing apparatus according to any of the twenty-first through the twenty-seventh aspects, wherein the stir chamber comprises: a metallic vessel forming the chamber conduit and the elbow conduit; a retainer structure encapsulating the metallic vessel, and the metallic vessel comprises a flange disposed at an upper end of the stir chamber opposite to the elbow conduit.

A twenty-ninth aspect of the present disclosure includes a glass manufacturing apparatus according to any of the twenty-first through the twenty-eighth aspects, wherein the stir chamber further comprises a plurality of flange extensions extending outward from the flange, the plurality of flange extensions connected to the stir chamber support cart.

A thirtieth aspect of the present disclosure includes a glass manufacturing apparatus according to any of the twenty-first through the twenty-ninth aspects, wherein the stir chamber further comprises a refractory body encapsulating the metallic vessel between the metallic vessel and the retainer structure.

A thirty-first aspect of the present disclosure includes a glass manufacturing apparatus according to any of the twenty-first through the thirtieth aspects, further comprising a plurality of expansion assists extending between the plurality of flange extensions and a flange support structure connected to the stir chamber support cart, the plurality of expansion assists applying an upward force to the flange to assist expansion of a portion of the stir chamber.

A thirty-second aspect of the present disclosure includes a glass manufacturing apparatus according to any of the twenty-first through the thirty-first aspects, wherein: the retainer structure comprises: a plurality of tension spring assemblies applying tension to the retainer structure around the refractory body in a circumferential direction; and a plurality of pressure bolt assemblies applying pressure to the metallic vessel via the refractory body in a radial direction.

A thirty-third aspect of the present disclosure includes a glass manufacturing apparatus according to any of the twenty-first through the thirty-second aspects, wherein the plurality of tension spring assemblies and the plurality of pressure bolts are disposed in a circumferentially alternating arrangement and configured to damp strain accumulation within the metallic vessel with thermal expansion of the second connector tube.

A thirty-fourth aspect of the present disclosure includes a glass manufacturing apparatus according to any of the twenty-first through the thirty-third aspects, wherein the second assembly comprises a plurality of support modules extending around segments of the second connector tube between the elbow conduit and the delivery vessel, wherein successive ones of the plurality of support modules are coupled to one another via a plurality of sliding joints such that ends of the plurality of modules move along the flow axis of the second connector tube upon thermal expansion of the second connector tube.

A thirty-fifth aspect of the present disclosure includes a glass manufacturing apparatus according to any of the twenty-first through the thirty-fourth aspects, further comprising an expansion assist assembly extending between successive ones of the plurality of support modules, the expansion assist assembly comprising a spring applying an elastic force along the flow axis of the second connector tube.

A thirty-sixth aspect of the present disclosure includes a method of alleviating stress at an exit port of a stir chamber of a glass manufacturing apparatus, the method comprising introducing molten glass into an entry port of the stir chamber, thereby causing the molten glass to flow through a metallic vessel of the stir chamber and into a connector tube connected to the exit port to a delivery vessel of the glass manufacturing apparatus, wherein: the connector tube comprises a flow axis extending partially upward in a vertical direction between the exit port and the delivery vessel, contact between molten glass and the connector tube causes thermal expansion of the connector tube along the axis, and the stir chamber is disposed on a base. The method also comprises permitting relative motion between the delivery vessel and the base as a result of the thermal expansion of the connector tube to alleviate stress accumulation at the exit port.

A thirty-seventh aspect of the present disclosure includes a method according to the thirty-sixth aspect, wherein: the molten glass causes thermal expansion of the metallic vessel of the stir chamber in the vertical direction, the base is attached to a stir chamber support cart extending between the entry port and the delivery vessel via a stir chamber support frame, and the permitting the relative motion between the delivery vessel and the base comprises sliding support members of the stir chamber support frame relative to the stir chamber support cart via a plurality of sliding joints in response to the thermal expansion of the metallic vessel.

A thirty-eighth aspect of the present disclosure includes a method according to any of the thirty-sixth through the thirty-seventh aspects, further comprising, prior to the introducing of the molten glass into the entry port, counterbalancing a weight of the stir chamber by applying a force in the vertically upward direction to the stir chamber support frame.

A thirty-ninth aspect of the present disclosure includes a method according to any of the thirty-sixth through the thirty-eighth aspects, wherein the permitting the relative motion between the delivery vessel and the base comprises translating the delivery vessel in a horizontal direction in response to the thermal expansion of the second connector tube.

A fortieth aspect of the present disclosure includes a method according to any of the thirty-sixth through the thirty-ninth aspects, further comprising, prior to the introducing of the molten glass into the entry port, attaching the metallic vessel to the base via a plurality of linkages extending radially outward from a flange of the metallic vessel.

A forty-first aspect of the present disclosure includes a method according to any of the thirty-sixth through the fortieth aspects, further comprising counterbalancing a weight of the flange prior to the introducing of the molten glass.

A forty-second aspect of the present disclosure includes a method according to any of the thirty-sixth through the forty-first aspects, further comprising assisting the expansion of the connector tube along the axis using an expansion assist.

A forty-third aspect of the present disclosure includes a method according to any of the thirty-sixth through the forty-second aspects, further comprising applying radial pressure to the metallic vessel after the introducing of the molten glass via a plurality of pressure bolt assemblies circumferentially distributed around the metallic vessel to avoid strain accumulation.

A forty-fourth aspect of the present disclosure includes a method according to any of the thirty-sixth through the forty-third aspects, wherein: the plurality of pressure bolt assemblies apply the radial pressure to a retainer structure encapsulating the metallic vessel, and the method further comprises circumferentially tensioning the retainer structure via a plurality of tension spring assemblies.

Additional features and advantages of the support structures and glass manufacturing apparatuses comprising the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description explain the principles and operations of the claimed subject matter.

DETAILED DESCRIPTION

Figure 1:
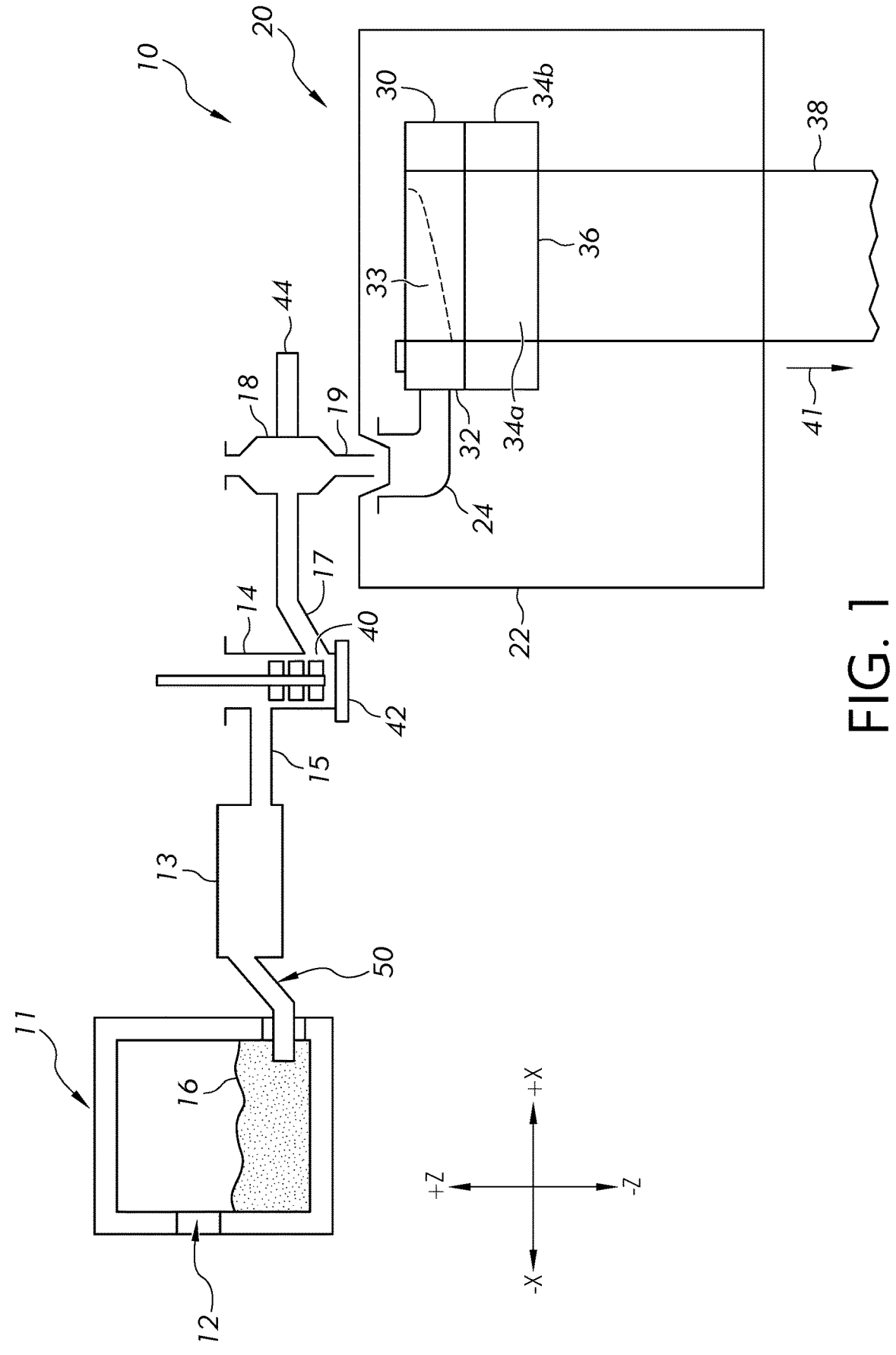
FIG. 1 schematically depicts a glass manufacturing apparatus, according to one or more embodiments shown and described herein.

Reference will now be made in detail to embodiments of support structures for molten glass delivery apparatuses and glass manufacturing apparatuses comprising the same, examples of which are illustrated in the accompanying drawings. Whenever possible, the same reference numerals will be used throughout the drawings to refer to the same or like parts. In embodiments, the glass manufacturing apparatuses described herein comprise a fining vessel receiving molten glass, a stir chamber comprising a stirring apparatus for homogenizing molten glass received from the fining vessel, and a delivery vessel re-directing the molten glass to a forming apparatus for forming the molten glass into a desired shape. The stir chamber may be fluidly connected to both the fining vessel and the delivery vessel with first and second connector tubes. Introduction of the molten glass into the connector tubes and stir chamber may cause thermal expansion thereof. Various structural aspects of the glass manufacturing apparatuses described herein prevent stress and strain build-up at a bottom portion of the stir chamber connected to the second connector tube. In embodiments, the support structures described herein permit a base of the stir chamber and the delivery vessel to move relative to one another during thermal expansion of various components of the glass manufacturing apparatus to avoid stress and strain accumulations. For example, in embodiments, the delivery vessel is attached to a reference point (e.g., a structure within the building in which the glass manufacturing apparatus is disposed) that is fixed along a vertical axis. A stir chamber support cart may be connected to the delivery vessel and be fixed along the vertical axis. The base of the stir chamber may be connected to the stir chamber support cart via a plurality of sliding joints formed between a stir chamber support frame and the stir chamber support cart. Such sliding joints may permit movement of the base of the stir chamber along the vertical axis in conjunction with thermal expansion of the stir chamber, thereby avoiding strain accumulation at the bottom of the stir chamber.

Such relative motion between the base of the stir chamber and delivery vessel during thermal expansion may avoid stress and strain accumulation resulting from expansion of the second connector tube. For example, in embodiments, the stir chamber comprises a chamber conduit extending along a stir chamber axis and an elbow conduit extending from the chamber conduit. The elbow conduit may connect the chamber conduit to the second connector tube. In embodiments, the second connector tube comprises a second connector tube axis that extends at an angle to the stir chamber axis, such that uninhibited thermal expansion thereof occurs at least partially along the vertical axis. Permitting relative movement between the base and the delivery vessel may facilitate thermal expansion of the second connector tube along the vertical axis, reducing stress accumulation over that present in glass manufacturing apparatuses where both the delivery vessel and base are fixed along the vertical axis. In embodiments, the second connector tube is supported by a plurality of support modules that extend along different axial segments of the second connector tube between the stir chamber and the delivery vessel. Such support modules may include support frames that are coupled to one another via a plurality of sliding joints permitting relative movement of the modules along the connector tube axis with thermal expansion of the second connector tube. In embodiments, an expansion assist member may extend between such support modules to facilitate such expansion along the connector tube axis to avoid strain accumulation.

Additional aspects of the stir chamber described herein may be designed to facilitate thermal expansion thereof. In embodiments, the stir chamber comprises a metallic vessel that contacts the molten glass, a refractory body encapsulating the metallic vessel to thermally insulate the metallic vessel, and a retainer structure supporting the metallic vessel and the refractory vessel. The refractory body may be constructed of a suitable refractory material (e.g., one or more ceramics). To permit thermal expansion of the metallic vessel while still maintaining sufficient pressure on the refractory body via the retainer (and thereby avoiding radial strain accumulation caused by glass pressure head build-up), the retainer may comprise a plurality of pressure bolt assemblies and tensioning spring assemblies distributed around a circumference of the stir chamber. In embodiments, the stir chamber comprises a flange extending from an upper end thereof. A plurality of flange extensions may extend from the flange to connect the metallic vessel to the stir chamber support cart. Such linkages establish the flange as a fabrication reference (i.e., a datum) for installing the refractory body and retainer of the stir chamber, thereby eliminating the need to fix a bottom of the stir chamber during fabrication and thereby avoid expansion inhibition.

As used herein, the term "fixed" may refer to both the mobility of a component in a reference frame and a manner of connection between two or more components. When a single component is referred to as "fixed," that component may be stationary within a reference coordinate system (e.g., associated with the earth or a building). When a first component is "fixed" to a second component or "fixedly attached" to the second component, the two components do not move relative to one another at least at the point of connection between the two components.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including matters of logic with respect to arrangement of steps, operational flow, order of components, or orientation of components; plain meaning derived from grammatical organization or punctuation, and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring to FIG. 1 by way of example, an embodiment of a glass manufacturing apparatus 10 for forming glass articles from molten glass is schematically depicted. The glass manufacturing apparatus 10 may include a melter 11, a fining system 13, a stir chamber 14, a delivery vessel 18, and a forming apparatus 20. Glass batch materials are introduced into the melter 11 through a batch inlet port 12. The batch materials are melted in the melter 11 to form molten glass 16. The melter 11 is fluidly coupled to the fining system 13 with a connector tube 50. The molten glass 16 flows from the melter 11, through the connector tube 50, and into the fining system 13.

The fining system 13 may comprise a high temperature processing area that receives the molten glass 16 from the melter 11. While the molten glass 16 is resident in the fining system 13, dissolved gasses and/or bubbles are removed from the molten glass 16. The fining system 13 may be fluidly coupled to the stir chamber 14 by a first connector tube 15. That is, molten glass flowing from the fining system 13 to the stir chamber 14 may flow through the first connector tube 15. As the molten glass 16 passes through the stir chamber 14, the molten glass 16 may be stirred to homogenize the molten glass. The stir chamber 14 may be, in turn, fluidly coupled to the delivery vessel 18 by a second connector tube 17 such that molten glass flowing from the stir chamber 14 to the delivery vessel 18 flows through the second connector tube 17. As depicted in FIG. 1, the second connector tube 17 at least partially extends upward along a vertical axis (e.g., the Z-axis depicted in FIG. 1). The upward extension of the second connector tube 17 may serve to regulate a pressure of the molten glass 16 flowing within the glass manufacturing apparatus 10. For example, in embodiments, the upward extension of the second connector tube 17 may prevent flow of molten glass to the delivery vessel 18 in the absence of pressure created by the stir chamber 14. For example, the stir chamber 14 may comprise a stirring apparatus creating a glass pressure head that induces movement of the molten glass from the melter 11 to the delivery vessel 18. As a result of the upward extension of the second connector tube 17, molten glass may not flow to the forming apparatus 20 in the absence of actuation of the stirring apparatus.

The delivery vessel 18 supplies the molten glass 16 through a downcomer 19 into the forming apparatus 20. The forming apparatus 20 may be, for example and without limitation, a fusion draw machine or another forming apparatus for forming molten glass into a glass article such as ribbons, tubes, boules, or the like. In the embodiment depicted in FIG. 1 the forming apparatus 20 is a fusion draw machine that comprises an enclosure 22 in which an inlet 24 and a forming vessel 30 are positioned. The molten glass 16 from the downcomer 19 flows into the inlet 24, which leads to the forming vessel 30. The forming vessel 30 includes an opening 32 that receives the molten glass 16. The molten glass 16 may flow into a trough 33 and then overflows and runs down two converging sides 34a and 34b of the forming vessel 30 before fusing together at a root 36 of the forming vessel 30, where the two sides join, before being contacted and drawn in a downstream direction 41 to form a continuous glass ribbon 38.

While FIG. 1 schematically depicts a glass manufacturing apparatus 10 for forming a glass ribbon using a fusion draw machine, other processes may be used to form the glass ribbon, including, without limitation, float glass processes, slot draw processes or the like. Further, while the glass manufacturing apparatus 10 is depicted as being used for forming glass ribbon, other glass manufacturing apparatuses may be used for forming glass stock material other than glass sheets including, without limitation, glass tubes, glass cylinders, boules, and the like.

The glass manufacturing apparatus 10 may be constructed at room temperature and thereafter operated at elevated temperatures. Heating the components of the glass manufacturing apparatus 10 to operating temperatures increases the dimensional size of the components according to their respective coefficients of thermal expansion. For example, the connector tubes 15, 17, and 50 and the stir chamber 14 may be formed from refractory metals and may thermally expand upon heating. The structure of the glass manufacturing apparatus 10 may inhibit expansion of one or more components and lead to stress accumulation in the components when heated to operating temperatures. As depicted in FIG. 1, for example, a bottom portion 40 of the stir chamber 14 is disposed on a base 42 and the stir chamber 14 is connected to the second connector tube 17. The base 42 may be fixed (i.e., mechanically grounded). The base 42 may inhibit expansion of the stir chamber 14 downward along the vertical axis (e.g., in the negative Z-direction), leading to stress buildup within the bottom portion 40 of the stir chamber 14. The base 42 may also inhibit expansion of the second connector tube 17 along an axis thereof, leading to an accumulation of stress and strain at the transition between the stir chamber 14 and the second connector tube 17. Such accumulated stress and strain within the stir chamber 14 and the second connector tube 17 may lead to failure of the components, disrupting operation of the glass manufacturing apparatus 10.

Disclosed herein are support structures for the stir chamber 14, second connector tube 17, and delivery vessel 18 that accommodate thermal expansion thereof to avoid such accumulated stresses and strains. The support structures of the present disclosure facilitate relative movement between the base 42 upon which the stir chamber 14 is disposed and a reference support 44 to which the delivery vessel 18 is attached. In embodiments, the reference support 44 may be fixed in the reference frame of the glass manufacturing apparatus 10. For example, in embodiments, the reference support 44 comprises a mounting structure fixedly attached to the ground or a wall of the building in which the glass manufacturing apparatus 10 is disposed. In embodiments, the support structures described herein facilitate movement of the base 42 relative to the reference support 44 along the vertical axis (e.g., the Z-axis in the coordinate axis depicted in FIG. 1) in response to thermal expansion of various components of the glass manufacturing apparatus 10. Upon heating, for example, the stir chamber 14 (or a portion thereof) may expand along the vertical axis and cause the base 42 to move downward along the vertical axis (e.g., in the negative Z-direction depicted in FIG. 1). In existing glass manufacturing apparatuses, the base 42 may be fixed relative to the reference support 44 (e.g., such that positioning of the base 42 relative to the reference support 44 does not change during thermal expansion of various components of the glass manufacturing apparatus 10), thereby inhibiting downward expansion of the stir chamber 14 and the second connector tube 17. Mobility of the base 42 along the vertical axis permits such downward expansion of the stir chamber 14 and avoids stress and strain accumulations resulting from thermal expansion.

In embodiments, the support structures described herein facilitate movement of the delivery vessel 18 along a horizontal axis (e.g., the X-axis in the coordinate axis depicted in FIG. 1) during thermal expansion of various components of the glass manufacturing apparatus 10. Such horizontal movement of the delivery vessel 18 may alleviate stress and strain accumulations in the second connector tube 17 near the bottom portion 40 of the stir chamber 14. Various aspects of support structures for providing such relative motion between the base 42 and delivery vessel 18 will now be described in greater detail.

Figure 2A:
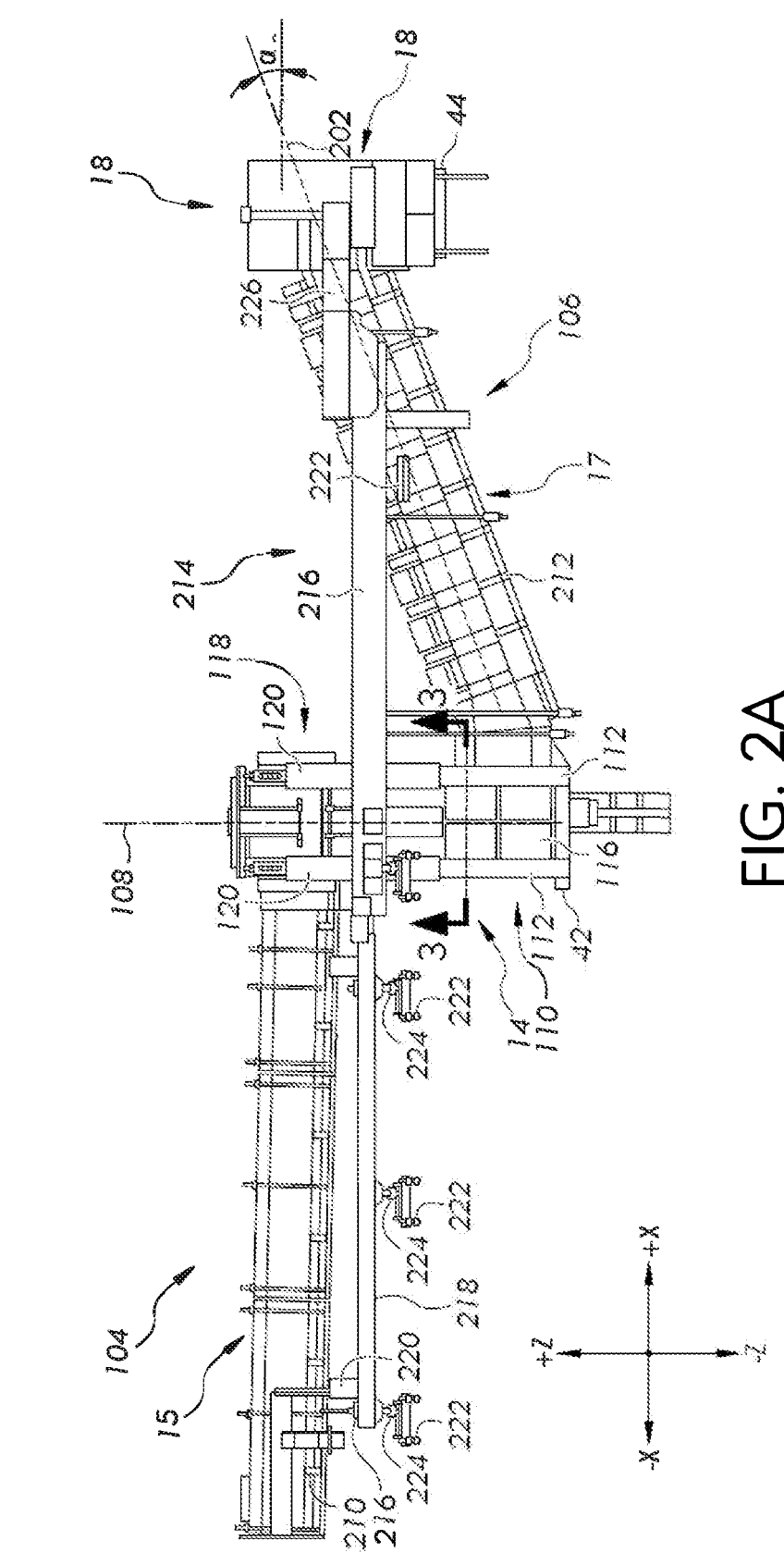
FIG. 2A schematically depicts a support structure providing structural support to a plurality of components of the glass manufacturing apparatus of FIG. 1, according to one or more embodiments described herein.

FIG. 2A schematically depicts a support structure 100 that structurally supports the components of the glass manufacturing apparatus 10 described herein with respect to FIG. 1. In embodiments, the support structure 100 comprises various components for supporting the first connector tube 15, stir chamber 14, and second connector tube 17 of the glass manufacturing apparatus 10 described herein with respect to FIG. 1. As depicted in FIG. 2A, the support structure 100 comprises a first assembly 104 extending between the fining system 13 (not depicted in FIG. 2A) and the stir chamber 14 and a second assembly 106 extending between the stir chamber 14 and the delivery vessel 18. The first assembly 104 comprises a first support frame 210 structurally supporting the first connector tube 15 and the second assembly 106 comprises a second support frame 212 structurally supporting the second connector tube 17. In embodiments, the first and second support frames 210 and 212 comprise a plurality of support members formed from a load bearing material such as, for example and without limitation, structural steel or a similar load bearing material. In embodiments, the first and second assemblies 104 and 106 further comprise refractory bodies (not depicted) extending between the first and second support frames 210 and 212 and the first and second connector tubes 15 and 17. The refractory bodies may thermally insulate the first and second connector tubes 15 and 17. In embodiments, the first and second assemblies 104 and 106 comprise a plurality of modules, with each of the modules being structurally supported by a separate support frame. In embodiments, each of the modules structurally supports a separate axial segment of one of the first or second connector tubes 15 or 17. In embodiments, molten glass is allowed to leak between adjacent modules of the first and second assemblies 104 and 106. As the molten glass cools and solidifies, a glass seal forms between adjacent ones of the modules to contain the molten glass within the first and second connector tubes 15 and 17. Such segmentation of the first and second assemblies 104 and 106 facilitates accommodation of thermal expansion of the first and second connector tubes 15 and 17.

In embodiments, the second connector tube 17 comprises a second connector tube axis 202 extending at an elevation angle $\alpha$ relative to a horizontal direction (e.g., the positive X-direction in the coordinate axis depicted in FIG. 2A). The second connector tube axis 202 may be a flow axis for the molten glass 16 (see FIG. 1) extending between the stir chamber 14 and the delivery vessel 18. The elevation angle α establishes a gravitational force countering the flow of molten glass that is overcome by the molten glass travelling through the second connector tube 17 to reach the delivery vessel 18. In embodiments, pressure accumulates in the molten glass as the molten glass travels through the stir chamber 14. The accumulated pressure is sufficient to overcome the upward extension of the second connector tube 17 and the associated gravitational force. In embodiments, a stirring apparatus (not depicted) disposed within the stir chamber 14 contributes to generating sufficient pressure for the molten glass to reach the delivery vessel 18. If the stirring apparatus is inactive and not pressurizing the molten glass, the molten glass may not reach the delivery vessel 18. The elevation angle α may facilitate preventing molten glass flow without disposing additional components (e.g., a stopping pin or the like) in the flow path of the molten glass.

In embodiments, the reference support 44 upon which the delivery vessel 18 is disposed comprises a mounting platform fixedly attached to an anchored structure (e.g., associated with the building in which the glass manufacturing apparatus 10 is disposed). In embodiments, the delivery vessel 18 is fixedly attached to the reference support 44. As such, the delivery vessel 18 may remain fixed irrespective of the thermal expansion of adjoining components (e.g., the second connector tube 17). Given such fixation of the delivery vessel 18, the support structure 100 comprises a stir chamber support cart 214 connected to the delivery vessel 18. The stir chamber support cart 214 is fixedly attached to the reference support 44 (e.g., via a support structure associated with the delivery vessel 18) and provides structural support to various components of the glass manufacturing apparatus 10. As depicted in FIG. 2A, the stir chamber support cart 214 comprises a support arm 216 extending at least partially in a horizontal direction (e.g., the +/−X-direction depicted in FIG. 2A) between the stir chamber 14 and the delivery vessel 18. The support arm 216 may be connected to the reference support 44 via an attachment arm 226. In embodiments, the support arm 216 is movably coupled to the attachment arm 226 to permit horizontal movement of the stir chamber support cart 214 relative to the reference support 44.

Referring still to FIG. 2A, the stir chamber support cart 214 further comprises an extension arm 218 extending from the support arm 216. The extension arm 218 is attached to the first support frame 210 of the first assembly 104 via one or more support brackets 220 such that the extension arm 218 vertically supports the first assembly 104. The support arm 216 and the extension arm 218 are further supported via a plurality of track assemblies 222. The plurality of track assemblies 222 may be fixedly attached to support structures (not depicted) coupled to the building in which the glass manufacturing apparatus 10 is disposed such that the track assemblies 222 are mechanically grounded (i.e., positionally fixed) within the reference frame of the glass manufacturing apparatus 10. In embodiments, the plurality of track assemblies 222 comprise tracks extending substantially in the horizontal direction. A plurality of roller assemblies 224 are slidably engaged with the plurality of track assemblies 222 to facilitate movement of the stir chamber support cart 214 relative to the plurality of track assemblies 222. In embodiments, thermal expansion of the first and second connector tubes 15 and 17 may cause the extension arm 218 to slide relative to the support arm 216 via the movable connection between the roller assemblies 224 and the track assemblies 222. In embodiments, the support arm 216 is movably attached to the delivery vessel 18 via the support arm 216 to facilitate horizontal movement of the support arm 216 in conjunction with thermal expansion of the second connector tube 17. As such, the plurality of track assemblies 222 and the plurality of roller assemblies 224 aid horizontal thermal expansion of the first and second connector tubes 15 and 17 while still providing structural support to the first and second assemblies 104 and 106 in the vertical direction.

In embodiments, the plurality of roller assemblies 224 are attached to the extension arm 218 via adjustment bolts. The adjustment bolts may be manually adjusted in response to thermal expansion of the stir chamber 14 in the vertical direction upon heating. In embodiments, for example, the stir chamber 14 may expand at least partially upward along an axis 108 thereof such that the entry port at which the second connector tube 17 is attached thereto moves upward. The adjustment bolts may facilitate movement of the first assembly 104 in conjunction with the vertical expansion of the stir chamber 14 to avoid strain accumulation at the entry port of the stir chamber 14 and potential leaks associated therewith. The adjustment bolts may also prevent the weight of the first assembly 104 from hampering vertical expansion of the stir chamber 14.

In embodiments, various aspects of the support structure 100 may be designed to reduce the need to manually adjust the adjustment bolts to accommodate vertical expansion of the stir chamber 14. As depicted in FIG. 2A, the support structure 100 comprises a stir chamber support frame 110 extending from the base 42 of the stir chamber 14. The stir chamber support frame 110 comprises a plurality of stir chamber support arms 112 extending vertically from the base 42 substantially parallel to the axis 108 of the stir chamber 14. In embodiments, the plurality of stir chamber support arms 112 are attached to a retainer structure 116 which is, in turn, coupled to the stir chamber 14 thereby providing structural support to the stir chamber 14.

Figure 2B:
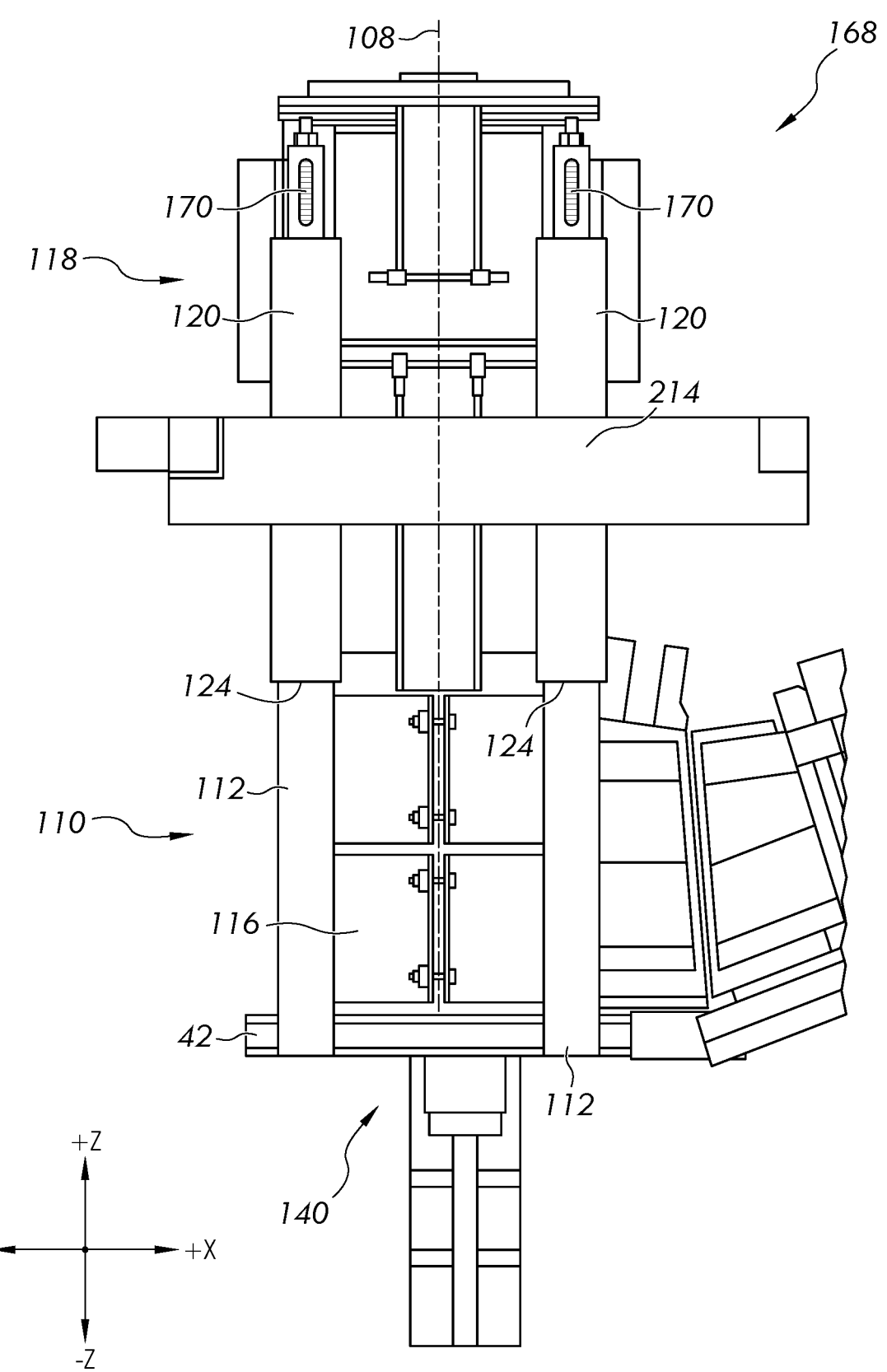
FIG. 2B schematically depicts a stir chamber support frame and a stir chamber support structure of the support structure of FIG. 2A, according to one or more embodiments described herein.

Referring now to FIGS. 2A and 2B, the support structure 100 further comprises a stir chamber support structure 118 fixedly attached to the stir chamber support cart 214. The stir chamber support structure 118 comprises a plurality of stir chamber support members 120 attached to the stir chamber support cart 214. The plurality of stir chamber support members 120 may extend vertically and substantially parallel to the axis 108 of the stir chamber 14. In embodiments, the plurality of stir chamber support members 120 comprise sleeves receiving the plurality of stir chamber support arms 112 of the stir chamber support frame 110. In embodiments, the plurality of stir chamber support members 120 are dimensioned to define cavities that are larger than circumferential dimensions of the plurality of stir chamber support arms 112 such that there are gaps 124 extending between the plurality of stir chamber support members 120 and the plurality of stir chamber support arms 112. The gaps 124 isolate the weight of the first assembly 104 from the stir chamber 14 and therefore prevent the weight of the first assembly 104 from inhibiting vertical expansion of the stir chamber 14.

In embodiments, the stir chamber support arms 112 are disposed within the stir chamber support arms 112 to create a plurality of sliding joints. The sliding joints may be configured to facilitate and guide movement of the plurality of stir chamber support arms 112 relative to the plurality of stir chamber support members 120 responsive to thermal expansion of the stir chamber 14. In embodiments, the sliding joints comprise one or more bearings (e.g., ball bearings, roller bearings, fluid bearings, or other suitable type of bearing) disposed in each of the gaps 124 to reduce friction from the movement of the plurality of stir chamber support arms 112 within the cavities defined by the plurality of stir chamber support members 120. In embodiments, the sliding joints are configured to guide relative movement of the plurality of stir chamber support arms 112 based on a predetermined thermal expansion path of the stir chamber 14. For example, based on the interconnections between the various components of the glass manufacturing apparatus 10 (see FIG. 1), the direction that the axis 108 extends may vary slightly depending on the thermal state of the glass manufacturing apparatus 10 (e.g., expansion of the second connector tube 17 may result in a slight clockwise rotation of the axis 108). The plurality of stir chamber support members 120 and sliding joints disposed therein may be designed to permit such rotational movement of the entire stir chamber 14 in addition to permitting movement (e.g., by providing adequate clearance for such movement) of the plurality of stir chamber support arms 102 along the axis 108. For example, the gaps 124 between the stir chamber support arms 112 and the stir chamber support members 120 may accommodate a slight rotation of the stir chamber 14 while also facilitating thermal expansion of the stir chamber 14 in the vertical direction.

By permitting the plurality of stir chamber support arms 112 to move relative to the stir chamber support cart 214, the stir chamber support structure 118 facilitates movement of the base 42 downward in the vertical direction in conjunction with thermal expansion of the bottom portion 40 of the stir chamber 14 (see FIG. 1). As a result of the gaps 124, the base 42 is permitted to move vertically relative to the reference support 44 to which the delivery vessel 18 is anchored. Such mobility of the base 42 facilitates axial thermal expansion of both the stir chamber 14 and the second connector tube 17, thereby preventing stress and strain accumulations therein.

Figure 2C:
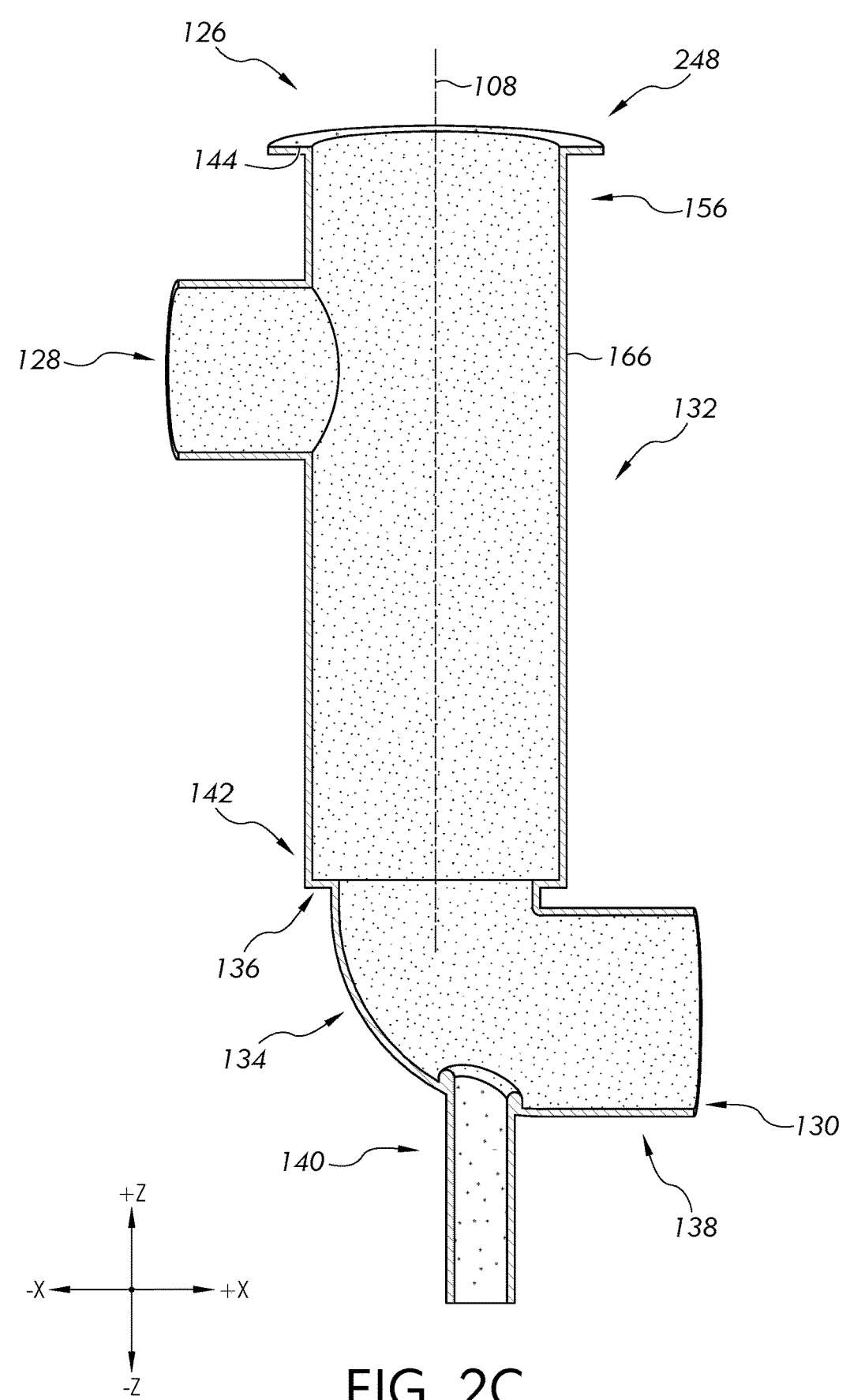
FIG. 2C schematically depicts a metallic vessel of a stir chamber of the glass manufacturing apparatus of FIG. 1, according to one or more embodiments described herein.

FIG. 2C schematically depicts a metallic vessel 126 of the stir chamber 14 described herein. In embodiments, the metallic vessel 126 is constructed of a metallic material such as platinum, a platinum alloy, or other suitable material. The metallic vessel 126 includes an entry port 128 and an exit port 130. The entry port 128 comprises an opening in fluid communication with the first connector tube 15 (see FIG. 1) and allows entry of molten glass therefrom into the stir chamber 14. Upon entry into the metallic vessel 126 via the entry port 128, the molten glass is guided towards the exit port 130 via a chamber conduit 132 and an elbow conduit 134. The chamber conduit 132 extends along the vertical direction such that gravity guides the molten glass therethrough towards the elbow conduit 134 along the axis 108. The elbow conduit 134 redirects the flow of the molten glass towards the second conductor tube 17 (see FIG. 1). The elbow conduit 134 comprises a first portion 136 extending substantially in a vertical direction (e.g., the Z-direction of the coordinate system depicted in FIG. 2C) from the chamber conduit 132 and a second portion 138 extending at an angle (e.g., perpendicular or substantially perpendicular to) relative to the first portion 136. The second portion 138 defines the exit port 130 and may be attached to the second connector tube 17 for delivery of the molten glass to the delivery vessel 18, as described herein.

As depicted in FIG. 2C, the metallic vessel 126 further comprises a drain tube 140 extending from the elbow conduit 134. In embodiments, the drain tube 140 is used to drain molten glass out of the stir chamber 14 (and other portions of the glass manufacturing apparatus 10) when the glass manufacturing apparatus 10 is not in use for production. In embodiments, the drain tube 140 extends through the base 42 (see FIG. 1) and provides a pathway for molten glass to be emptied from the stir chamber 14. In embodiments, the drain tube 140 is not fixedly attached to the base 42, but rather slidably engaged therewith such that the portions of the drain tube 140 may slide relative to the base 42 in response to thermal expansion of the metallic vessel 126. Such mobility of the drain tube 140 in the vertical direction beneficially prevents inhibition of downward expansion of the metallic vessel 126. For example, if the drain tube 140 is fixedly attached to the base 42, downward expansion of the metallic vessel 126 may be inhibited, resulting in strain and buckling stress in a lower portion 142 of the chamber conduit 132 and the elbow conduit 134. By permitting vertical mobility of the drain tube 140, the support structure 100 described herein beneficially avoids such strain and buckling stresses, thereby avoiding potential leaks and facilitating long-term operability of the glass manufacturing apparatus 10.

In embodiments, the second portion 138 of the elbow conduit 134 may extend in a different direction than the second connector tube 17. In the depicted embodiment, for example, the second portion 138 extends in the horizontal direction (e.g., in the X-direction of the coordinate system depicted in FIG. 2C), while the second connector tube 17 extends along the second connector tube axis 202 at the elevation angle α to the horizontal direction (see FIG. 2A). As a result, axial expansion of the second connector tube 17 occurs at least partially downward in the vertical direction. Given this, the mobility of the drain tube 140 described herein also permits axial expansion of the second connector tube 17, thereby avoiding strain accumulation at the point of connection between the second connector tube 17 and the elbow conduit 134.

In existing glass manufacturing apparatuses, the base 42 and drain tube 140 are vertically fixed to provide a fabrication base for additional components (e.g., a refractory body and retainer structure) of the stir chamber 14. Fixation of the drain tube 140 may hold the metallic vessel 126 in place to permit construction of such additional components around the metallic vessel 126. However, because the drain tube 140 is movable in the depicted embodiment, one or more alternative locations of the metallic vessel 126 may be fixed to facilitate assembly of the stir chamber 14. In embodiments, the metallic vessel 126 comprises a flange 144 at an upper end thereof. The flange 144 typically serves as a connection point for an electrical current source providing an electrical current to the metallic vessel 126 for heating the molten glass therein. In the depicted embodiment, the flange 144 may be vertically fixed to serve as the fabrication reference typically served by the drain tube 140 in existing glass manufacturing apparatuses. The flange 144 may be fixed (not depicted) within a reference frame of the glass manufacturing apparatus 10 to facilitate assembly of the stir chamber 14.

Figure 2D:
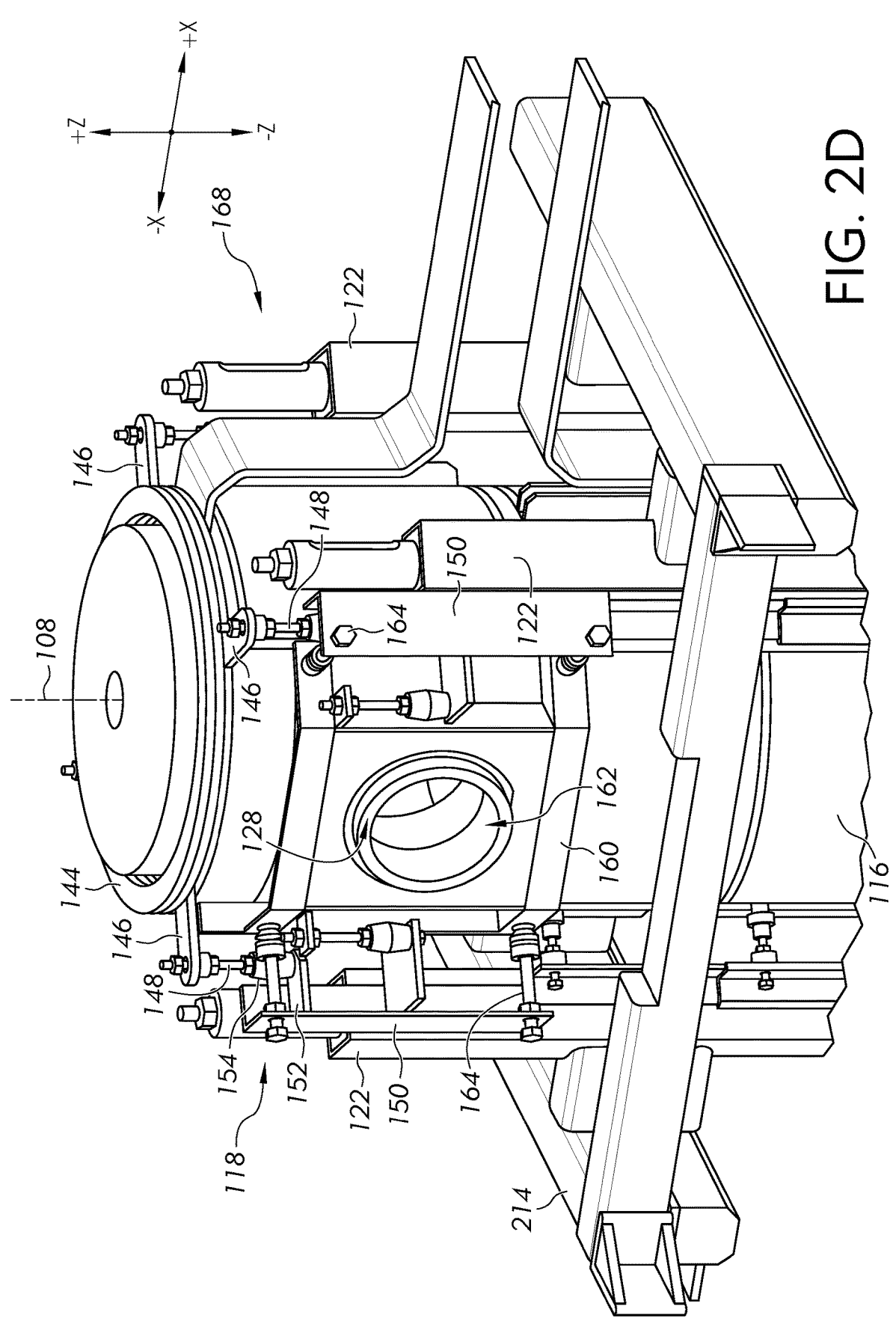
FIG. 2D schematically depicts a stir chamber support structure and a stir chamber support cart of the support structure of FIG. 2A, according to one or more embodiments described herein.

Referring now to FIG. 2D, in embodiments, the flange 144 comprises a plurality of flange extensions 146 extending radially outward from the main body of the metallic vessel 126 (e.g., radially away from the axis 108 from a main portion of the flange 144). The flange extensions 146 may be constructed from the same material as the remainder of the flange 144. The flange extensions 146 are attached to the stir chamber support structure 118 via a plurality of bolt assemblies 148. In the embodiment depicted in FIG. 2D, the stir chamber support structure 118 comprises a plurality of support brackets 150 attached to the plurality of stir chamber support members 120. Each of the plurality of support brackets 150 comprises a support surface 152 extending perpendicular or substantially perpendicular (e.g., within 20° thereof) to the axis 108. The plurality of bolt assemblies 148 extend between the flange extensions 146 and the support surfaces 152 of the plurality of support brackets 150 to fix the flange 144 of the metallic vessel 126 in the vertical direction. That is, the stir chamber support structure 118 serves as a fabrication reference for the stir chamber 14 via the flange 144 of the metallic vessel 126. In embodiments, for example, the flange 144 is fixedly attached to the stir chamber support cart 214 via the plurality of flange extensions 146 to facilitate assembly of the remainder of the stir chamber 14 around the metallic vessel 126.

In embodiments, each of the plurality of bolt assemblies 148 comprises a spring assembly 154. In embodiments, each spring assembly 154 comprises a spring or other suitable elastic member that is compressed between one of the support surfaces 152 of the stir chamber support structure 118 and a housing of the spring assembly 154. As a result of such compression, the spring assemblies 154 apply a force to the flange 144 vertically upward along the axis 108. The force applied by the spring assemblies 154 may assist thermal expansion of an upper portion 156 (see FIG. 2C) of the metallic vessel 126 extending between the entry port 128 and the flange 144. As such, the flange extensions 146 facilitate thermal expansion of multiple different portions of the metallic vessel 126: the lower portion 142 by permitting mobility of the drain tube 140 relative to the base 42; and the upper portion 156 by facilitating a mechanical connection with the stir chamber support structure 118 via the spring assemblies 154, which provide a force that counteracts the weight of the flange 144 and any components attached thereto.

Referring still to FIG. 2D, the stir chamber support structure 118 further comprises a support frame 160 structurally supporting the entry port 128 of the metallic vessel 126. In embodiments, the support frame 160 comprises an opening 162 through which the entry port 128 of the metallic vessel 126 extends. The support frame 160 is attached to the stir chamber support cart 214 via a plurality of connecting bolts 164 extending between the plurality of support brackets 150 and the support frame 160. As such, via the opening 162 and fixation to the stir chamber support cart 214, the support frame 160 holds the entry port 128 in place during thermal expansion of the metallic vessel 126. Since the entry port 128 is held fixed, the first assembly 104 of the support structure 100 (see FIG. 2A) may remain fixed during operation of the glass manufacturing apparatus and the need to adjust the vertical position thereof (via the vertical adjustment bolts depicted in FIG. 2A) is eliminated or reduced. The support frame 160 also prevents the weight of the first assembly 104 from inhibiting thermal expansion of the metallic vessel 126.

Referring to FIGS. 2C and 2D, the vertical extension of the chamber conduit 132 may result in the weight of the metallic vessel 126 inhibiting thermal expansion of different portions of the metallic vessel 126 in various ways. For example, upward thermal expansion of the lower portion 142 and other portions of the metallic vessel 126 extending above the lower portion 142 may be inhibited by the weight of the upper portion 156 and flange 144. Such inhibition may result in the metallic vessel 126 comprising a neutral point of thermal expansion 166 that tends to remain axially stationary even during periods of thermal expansion. In embodiments, the metallic vessel 126 and support structure 100 are constructed such that the neutral point of thermal expansion 166 is positioned along the axis 108 at a vertical elevation that overlaps with the entry port 128. Given that the entry port 128 is held fixed by the support frame 160, such positioning of the neutral point of thermal expansion 166 prevents the support frame 160 from inhibiting thermal expansion of various portions of the metallic vessel 126 and prevents stress and strain from accumulating at the entry port 128.

Referring to FIGS. 2B and 2D, the stir chamber support structure 118 further comprises a mass compensation system 168 configured to apply a compensating force to at least a portion of the stir chamber support structure 118 in the vertically upward direction. The force applied by the mass compensation system 168 may counterbalance at least a portion of the gravitational force from the mass of the stir chamber 14 to prevent stress and strain accumulations in the metallic vessel 126. In the depicted embodiments, the mass compensation system 168 comprises a plurality of mass compensation members 170 disposed at ends of each of the plurality of stir chamber support arms 112. In embodiments, via connections with the plurality of stir chamber support members 120, the plurality of mass compensation members 170 may apply an upward force to the stir chamber support frame 110 to counterbalance the weight of the stir chamber 14 and prevent undesired stress and strain accumulation within the metallic vessel 126. In embodiments, the plurality of mass compensation members 170 each comprise a spring member, or other suitable load source, such as a pneumatic cylinder, a hydraulic cylinder, a compression spring or the like, which exerts a biasing force in the vertically upward direction. In embodiments, the force exerted by each of the plurality of mass compensation members 170 is the same to provide a balanced counterbalancing force.

The mass compensation system 168 may take a variety of forms depending on the implementation. For example, in embodiments, the plurality of mass compensation members 170 comprise attachment bolts, such as spring bolts, coupling each of the plurality of stir chamber support arms 112 to the stir chamber support structure 118. In such embodiments, the attachment bolts may be manually adjusted during operation of the glass manufacturing apparatus to permit thermal expansion of the metallic vessel 126. In embodiments, the mass compensation system 168 comprises a single mass compensation member attached to the stir chamber support cart 214. For example, in embodiments, the mass compensation system 168 comprises a pneumatic cylinder or actuator (not depicted) extending, for example, between the base 42 and the stir chamber support cart 214. The pneumatic cylinder or actuator applies a compensation force to the stir chamber support cart 214. In other embodiments, the mass compensation system 168 comprises a counterbalancing weight (not depicted) pivotally coupled to the stir chamber support cart 214 via a pivot arm extending at least partially horizontally (e.g., in the +/−X-direction of the coordinate axes depicted in FIG. 2D) from the stir chamber support cart 214. The pivot arm may serve as a torque multiplier such that the weight of the counterbalancing weight applies a vertically upward compensation force to the stir chamber support cart 214 via the pivot arm.

Figure 3:
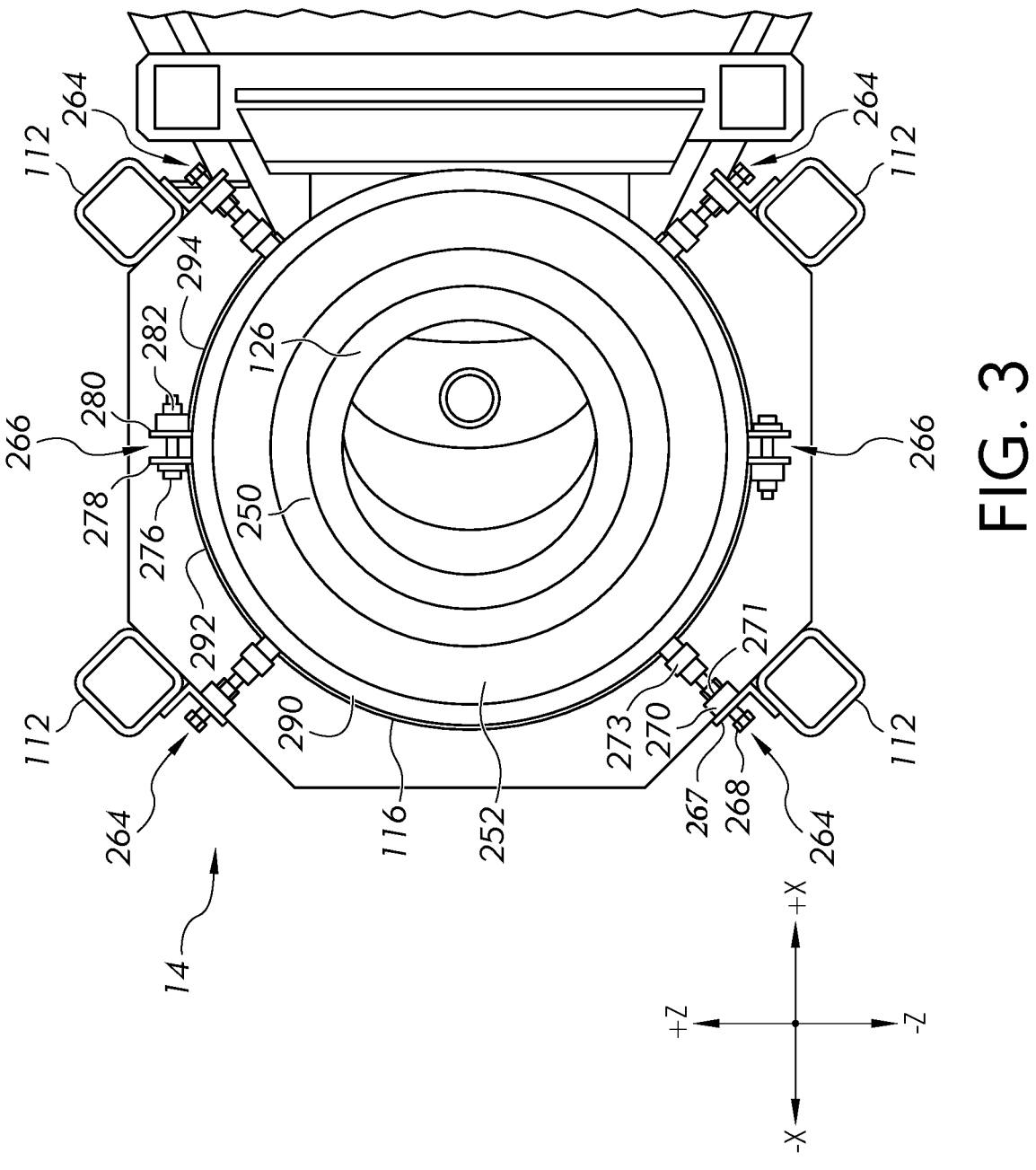
FIG. 3 schematically depicts a cross-sectional view of the glass manufacturing apparatus of FIG. 1, including the support structure of FIG. 2A, through the line 3-3 in FIG. 2A, according to one or more embodiments described herein.

FIG. 3 schematically depicts a cross-sectional view of the stir chamber 14 (including a portion of the support structure 100 associated therewith) through the line 3-3 of FIG. 2A in accordance with an exemplary embodiment. In the depicted embodiment, in addition to the metallic vessel 126 described herein with respect to FIG. 2B, the stir chamber 14 comprises a cast element 250 surrounding the metallic vessel 126, a refractory body 252 surrounding the cast element 250, and the retainer structure 116. In embodiments, the cast element 250 at least partially encapsulates the metallic vessel 126 and is constructed from a castable refractory such as a cast ceramic cement. The cast element 250 may provide structural support and thermal insulation to the metallic vessel 126. In embodiments, the stir chamber 14 comprises a gap (not depicted) extending between the metallic vessel 126 and the cast element 250 (e.g., resulting from solidification of the cast element 250). Such a gap may provide space for thermal expansion of the metallic vessel 126 radially outward from the axis 108 (see FIG. 2A).

In embodiments, the refractory body 252 encapsulates and surrounds the cast element 250. The refractory body 252 may be constructed of refractory ceramic material that insulates the metallic vessel 126, and the molten glass flowing therethrough. In embodiments, the refractory body 252 minimizes temperature variations in the radial direction of the metallic vessel 126. The refractory body 252 may be formed from, for example and without limitation, alumina, zirconia, stabilized zirconia, and/or combinations thereof. In embodiments, the refractory body 252 may be formed from a plurality of discrete portions that are assembled around the metallic vessel 126. As described herein, the retainer structure 116 provides structural support to the other components of the stir chamber 14 by providing linkages to, for example, the stir chamber support frame 110 and the stir chamber support cart 214. The retainer structure 116 may be formed from a load bearing material such as, for example and without limitation, structural steel or a similar load bearing material.

In embodiments, the retainer structure 116 and the refractory body 252 apply a pressure to the metallic vessel 126 in a radially inward direction (e.g., towards the axis 108 depicted in FIG. 2C) to counteract deformation of the metallic vessel 126 resulting from thermal expansion during operation of the glass manufacturing apparatus 10. For example, consistent stress from the molten glass may result in creep of the metallic vessel 126 such that the metallic vessel deforms in the radially outward direction if the metallic vessel 126 is without sufficient structural support. In particular, at the lower portion 246 of the chamber conduit 132 and the elbow conduit 134 (see FIG. 2C), glass head pressure may result in additional stress and strain accumulating in the metallic vessel 126. Over extended periods of operation, accumulated stress and strain from creep and glass head pressure may result in additional leaks or deformation of the metallic vessel 126, or even failure of the metallic vessel 126.

In embodiments, to counteract accumulated stress and strain associated with creep and glass head pressure, the retainer structure 116 further comprises a plurality of pressure bolt assemblies 264 and a plurality of tension spring assemblies 266. The plurality of pressure bolt assemblies 264 are configured to apply pressure to the metallic vessel 126 in a radially inward direction (e.g., towards the axis 108 depicted in FIG. 2A) to damp stretching and radial stress and strain accumulation in the metallic vessel 126. As depicted in FIG. 3, the plurality of pressure bolt assemblies 264 comprise connector bolts 268 extending between the stir chamber support frame 110 (see FIG. 2A) and a body 290 of the retainer structure 116 encapsulating the refractory body 252, thereby coupling the retainer structure 116 to the stir chamber support frame 110.

In embodiments, the stir chamber support frame 110 comprises a plurality of support brackets 267 extending from each of the plurality of stir chamber support arms 112. Each connector bolt 268 associated with one of the plurality of pressure bolt assemblies 264 may extend through one of the support brackets 267 towards the body 290 of the retainer structure 116. Pressure heads 273 extend from each connector bolt 268 and contact the body 290 of the retainer structure 116. In embodiments, each of the plurality of pressure bolt assemblies 264 comprises a spring assembly 270 (or other force applicator such as a pneumatic cylinder or the like) including a spring or other suitable elastic member compressed via one of the support brackets 267. The spring assembly 270 may result in the connector bolt 268 applying a force in a radially inward direction (e.g., towards the axis 108, see FIG. 2A) to counteract creep and radially outward expansion from glass head pressure.

In embodiments, the plurality of pressure bolt assemblies 264 are arranged to provide a circumferentially uniform distribution of radial pressure to the metallic vessel 126. For example, in the depicted embodiment, the plurality of pressure bolt assemblies 264 are arranged in an opposing relationship so that each of the plurality of pressure bolt assemblies 264 comprises an opposing pressure bolt assembly extending at either end of an outer diameter of the refractory body 252. While the plurality of pressure bolt assemblies 264 in the depicted embodiment are each coupled to one of the plurality of stir chamber support arms 112, it should be understood that alternative embodiments are envisioned including differing numbers and arrangements for the plurality of pressure bolt assemblies 264. For example, in embodiments, the support structure 100 comprises independently supported pressure bolt assemblies not directly connected to one of the plurality of stir chamber support arms 112. Any number and arrangement of pressure bolt assemblies may be used in accordance with the present disclosure.

Referring still to FIG. 3, the plurality of tension spring assemblies 266 can maintain geometrical proportions of the retainer structure 116 to maintain the structural support provided to the metallic vessel 126. The body 290 of the retainer structure 116 is depicted to include a first circumferential segment 292 and a second circumferential segment 294. The first and second circumferential segments 292 and 294 comprise extensions 278 and 280 at ends thereof extending radially outward. The plurality of tension spring assemblies 266 connect the first and second circumferential segments 292 and 294 to one another via the extensions 278 and 280. In the depicted embodiment, each of the plurality of tension spring assemblies 266 comprises a connector rod 276 extending through openings in the extensions 278 and 280. A spring assembly 282 is disposed on an outside surface of the extension 280, while a head of the connector rod 276 is disposed on an outside surface of the extension 278. A spring or other suitable elastic member of the spring assembly 282 is compressed to generate a force in a plane perpendicular to the axis 108 (e.g., in the +/−X-direction in the coordinate axes depicted in FIG. 3).

In response to thermal expansion of the metallic vessel 126 and radial compression of the spring assemblies 270 of the pressure bolt assemblies 264, the tension spring assemblies 266 may prevent the circumferential segments 292 and 294 of the body 290 from separating from one another, and thereby facilitate the retainer structure 116 maintaining pressure on the metallic vessel 126 via the refractory body 252. The plurality of tension spring assemblies 266 facilitate the body 290 maintaining a cross-sectional profile regardless of the expansion state of the metallic vessel 126, thereby preventing deformation and failure of the metallic vessel 126. In the depicted embodiment, the plurality of tension spring assemblies 266 and the plurality of pressure bolt assemblies 264 are disposed in an alternating circumferential arrangement where at least one of the pressure bolt assemblies 264 is disposed between successive ones of the plurality of tension spring assemblies 266. Such an arrangement is beneficial in that the tension spring assemblies 266 disposed on either side of one of the pressure bolt assemblies 264 can counteract any radial motion of the portion of the body 290 compressed via the pressure bolt assembly 264. However, it should be understood that alternative embodiments including different circumferential distributions of pressure bolt assemblies and tension spring assemblies are also envisioned. For example, in some embodiments the retainer structure 116 may not include the plurality of pressure bolt assemblies 264. In some embodiments, the retainer structure 116 may not include the plurality of tension spring assemblies 266.

Figure 4:
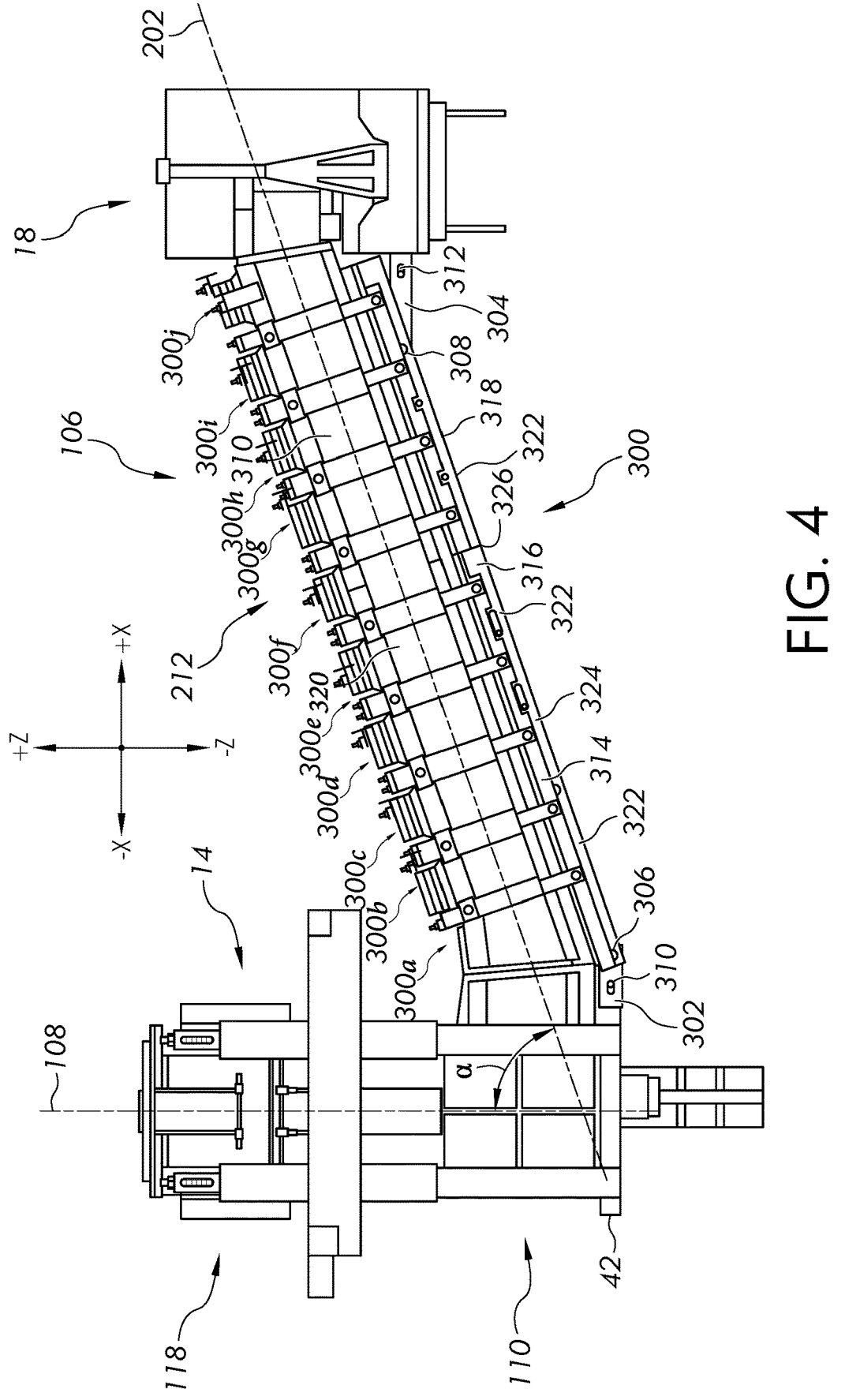
FIG. 4 schematically depicts an assembly of the support structure of FIG. 2B extending between a stir chamber and a delivery vessel of the glass manufacturing apparatus of FIG. 1, according to one or more embodiments described herein.

Referring now to FIG. 4, an example of the second assembly 106 of the support structure 100 described herein with respect to FIG. 2A is schematically depicted. With reference to FIGS. 1 and 4, the second assembly 106 comprises the second support frame 212 for the second connector tube 17 extending between the base 42 and the delivery vessel 18. The second support frame 212 comprises a plurality of modules 300 (e.g., a first module 300a, a second module 300b, a third module 300c, a fourth module 300d, a fifth module 300e, a sixth module 300f, a seventh module 300g, an eighth module 300h, a ninth module 300i, and a tenth module 300j) extending around different axial segments of the second connector tube 17 between the elbow conduit 134 (see FIG. 2C) and the delivery vessel 18. In embodiments, each of the plurality of modules 300 comprises a carriage 320 defining a support volume through which the second connector tube 17 (and any additional components encapsulating the second connector tube 17, such as refractory bodies encapsulating an axial segment of the second connector tube 17) extends. Each of the plurality of modules 300 may also comprise a separate support frame to structurally support one of the axial segments of the second connector tube 17 via the refractory body of that module. For example, the second support frame 212 is depicted to include a first support frame 302 extending from the base 42 and a second support frame 304 extending from the delivery vessel 18. First, second, and third axial support frames 314, 316, and 318 extend parallel or substantially parallel to the second connector tube axis 202 and connect the first and second support frames 302 and 304 to one another. While the depicted embodiment includes three axial support frames, a first axial support frame 314, a second axial support frame 316, and a third axial support frame 318, it should be understood that the second assembly 106 may include any number of such axial support frames in accordance with the present disclosure.

In embodiments, the first support frame 302 is connected to the first axial support frame 314 via a first connector 306 and the second support frame 304 is connected to the third axial support frame 318 via a second connector 308. In embodiments, the first axial support frame 314 is rotatably coupled to the first support frame 302 via the first connector 306 and the third axial support frame 318 is rotatably coupled to the second support frame 304 via the second connector 308. The first support frame 302 may be attached to the base 42 via an attachment pin 310 extending from the base 42. The attachment pin 310 may extend through a slot in the first support frame 302. The slot in the first support frame 302 may extend in a horizontal direction (e.g., along the X-direction of the coordinate axes depicted in FIG. 4) to permit the first support frame 302 to move relative to the base 42 in response to horizontal thermal expansion of the second connector tube 17. The second support frame 304 may be attached to the delivery vessel 18 via an attachment pin 312 extending from a portion (e.g., a base) of the delivery vessel 18. The attachment pin 312 may extend through a slot in the second support frame 304. The slot in the second support frame 304 may extend in the horizontal direction to permit the second support frame 304 to move relative to the delivery vessel 18 in response to horizontal thermal expansion of the second connector tube 17. The rotatable connection between the first and second support frames 302 and 304 and the first and third axial support frames 314 and 318 may facilitate maintaining the angle α between the second connector tube axis 202 and the axis 108 of the stir chamber 14 (see FIG. 2A) as thermal expansion and contraction of the second connector tube 17 takes place, thereby preventing the accumulation of various stresses and strains therein.

The plurality of modules 300 and the first, second, and third axial support frames 314, 316, and 318 may take a variety of forms such that the plurality of modules 300 are movable relative to one another to avoid hindering thermal expansion of the second connector tube 17 (see FIG. 1) along the second connector tube axis 202. For example, in embodiments, each of the first, second, and third axial support frames 314, 316, and 318 may each include one or more rail systems 322 that supports a carriage 320 of one of the plurality of modules 300. The rail systems 322 of the first, second, and third axial support frames 314, 316, and 318 may extend parallel or substantially parallel to the second connector tube axis 202 to structurally support the second connector tube 17 in a desired orientation. The carriages 320 may be movably coupled to the rail systems 322 via rollers to permit movement of each carriage 320 along the second connector tube axis 202 during thermal expansion and compaction of the second connector tube 17.

In embodiments, the rail systems 322 of the first, second, and third axial support frames 314, 316, and 318 are movably coupled to one another via sliding joints 324 and 326. For example, in embodiments, the first and third axial support frames 314 and 318 at least partially overlap with the second axial support frame 316 along the second connector tube axis 202, and movable coupling assemblies (e.g., rollers, rails mounted brackets, or the like—not depicted in FIG. 4) couple the first and third axial support frames 314 and 318 to the second axial support frame 316 at the positions of axial overlap to form the sliding joints 324 and 326. For example, in embodiments, the first, second, and third axial support frames 314, 316, and 318 comprise housings or support structures for the rail systems 322 that overlap with one another to form the sliding joints 324 and 326. The movable connection between the first, second, and third axial support frames 314, 316, and 318 facilitates thermal expansion of the second connector tube 17 away from the delivery vessel 18 (e.g., towards the base 42) to prevent stress and strain accumulation during operation.

Figure 5:
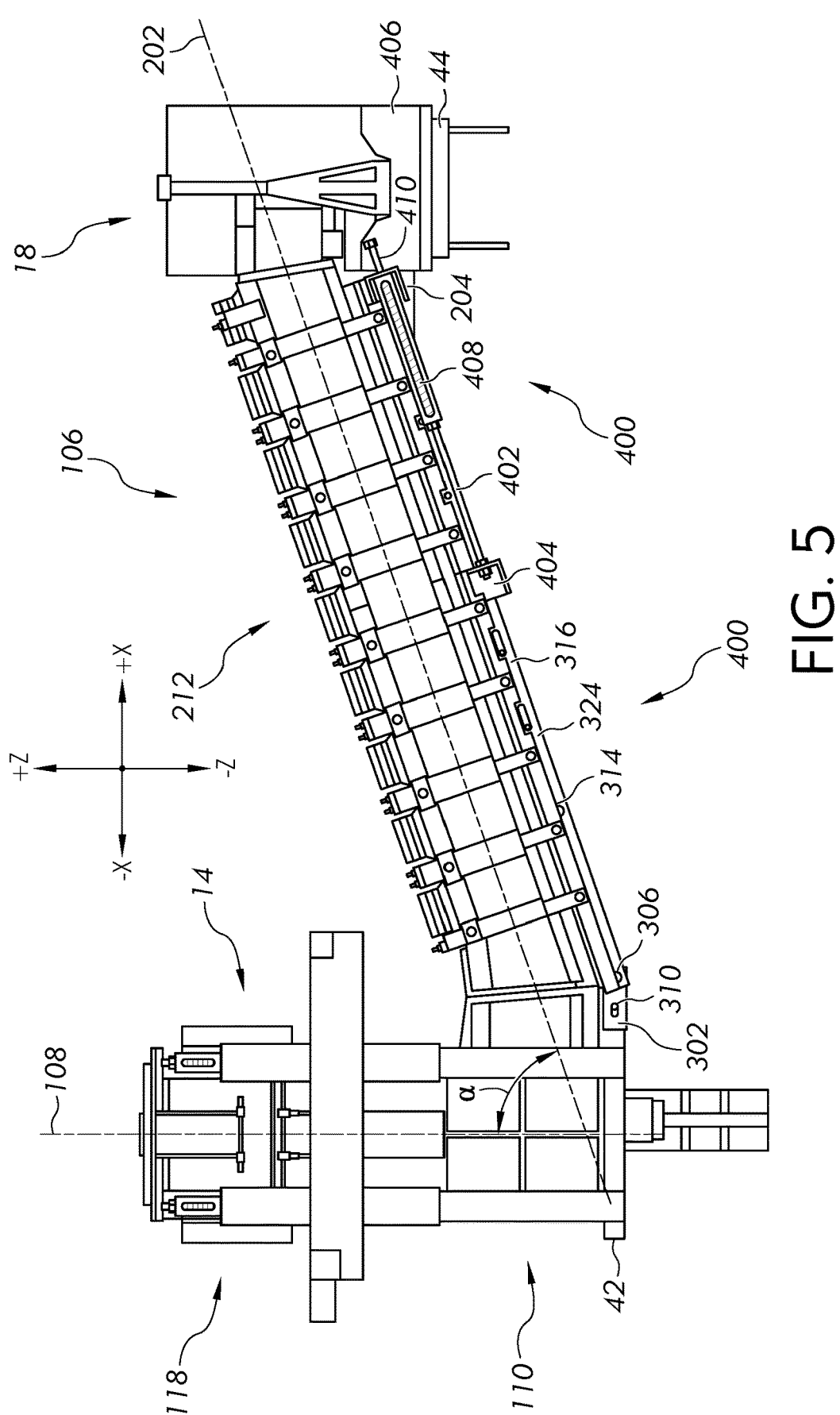
FIG. 5 schematically depicts the assembly of FIG. 4 including an expansion assist, according to one or more embodiments described herein.

FIG. 5 schematically depicts another example embodiment of the second assembly 106 of the support structure 100 described herein with respect to FIG. 2A. In embodiments, the second assembly 106 is similar in structure to the embodiment described herein with respect to FIG. 4. Accordingly, like reference numerals are incorporated into FIG. 4 to indicate the incorporation of such like components. The embodiment of the second assembly 106 depicted in FIG. 5 may differ from that described with respect to FIG. 5 in that an expansion assist 400 extends between the delivery vessel 18 and the second axial support frame 316. In the depicted embodiment, the expansion assist 400 comprises a rod 402 extending between the delivery vessel 18 and a support bracket 404 attached to the second axial support frame 316. The rod 402 is connected to a base 406 of the delivery vessel 18 via a connector assembly 410. In embodiments, the connector assembly 410 comprises a support bracket coupled to the third axial support frame 318. In embodiments, the rod 402 extends across the sliding joint 326 (not depicted in FIG. 5, see FIG. 4) between the first and second axial support frames 314 and 316 in a direction parallel to the second connector tube axis 202.

In embodiments, the expansion assist 400 comprises a spring assembly 408 extending around the rod 402. The spring assembly 408 may be compressed to provide an elastic force extending towards the base 42. By extending across the sliding joint 326, such an elastic force may aid movement of the second and third axial support frames 316 and 318 relative to one another to assist in expansion of the second connector tube 17 along the second connector tube axis 202 away from the delivery vessel 18. The expansion assist 400 may also negate the weight of the stir chamber 14 to further prevent inhibition of expansion of the second connector tube 17. While the expansion assist 400 depicted in FIG. 5 includes the spring assembly 408, alternative assisting mechanisms are contemplated and within the scope of the present disclosure. For example, in embodiments, the expansion assist 400 can include a pneumatic cylinder, an actuator, or any other load source capable of applying an assistive force along the second connector tube axis 202 away from the delivery vessel 18.

While the depicted embodiment incorporates a single expansion assist 400 extending along a portion of the second support frame 212 that is proximate to the delivery vessel 18, alternative arrangements, including differently positioned and/or numbers of the expansion assists, are contemplated and within the scope of the present disclosure. For example, in embodiments, a plurality of expansion assists similar in structure to the expansion assist 400 described herein may extend from the delivery vessel 18. In embodiments, the plurality of expansion assists may extend to different axial locations on the second support frame 212. In embodiments, one or more expansion assists may apply force directly to the base 42 or stir chamber 14 to prevent expansion of the second connector tube 17 from being inhibited.

Figure 6:
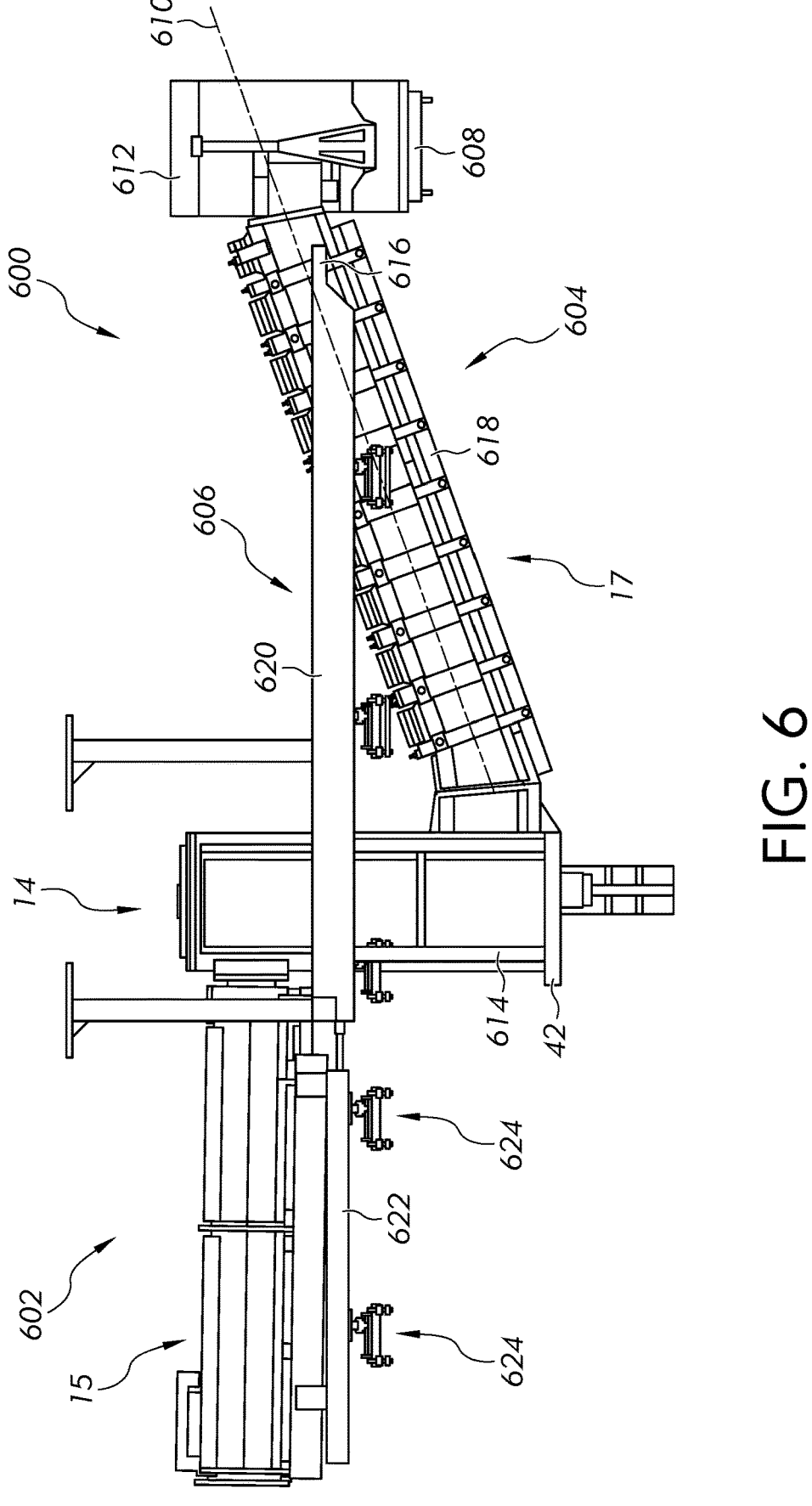
FIG. 6 schematically depicts a support structure providing structural support to a plurality of components of the glass manufacturing apparatus of FIG. 1, according to one or more embodiments described herein.

FIG. 6 schematically depicts a support structure 600 for providing structural support to the various structural components of the glass manufacturing apparatus 10 described herein with respect to FIG. 1. The support structure 600 comprises a first assembly 602 providing structural support to the first connector tube 15 and a second assembly 604 providing structural support to the second connector tube 17. In embodiments, the first and second assemblies 602 and 604 are similar in structure to the first and second assemblies 104 and 106 described herein with respect to FIGS. 2A-5. The support structure 600 may differ from the support structure 100 described herein with respect to FIGS. 2A-5 in that the support structure 600 may be designed to accommodate the base 42 of the stir chamber being stationary (e.g., fixed in the reference frame of the glass manufacturing apparatus 10). The support structure 600 may permit the stir chamber 14 to freely expand in an upward direction (e.g., the positive Z-direction of the coordinate axis depicted in FIG. 6).

To avoid inhibition of expansion of the second connector tube 17 along a connector tube axis 610 and avoid stress and strain accumulation therein, the delivery vessel 18 may be movable in the horizontal direction (e.g., the positive or negative X-directions in the coordinate axis in FIG. 6). As depicted in FIG. 6, for example, the delivery vessel 18 is disposed on a support cart 608. The support cart 608 is movable in the reference frame of the glass manufacturing apparatus 10 (e.g., not fixedly attached to a fixed structure). In embodiments, for example, the support cart 608 comprises a roller assembly (not depicted) that engages with a support structure (e.g., a rail structure, a surface, or the like) that is fixed in the reference frame of the glass manufacturing apparatus 10. That is, the support cart 608 movably supports the delivery vessel 18. In embodiments, the support cart 608 is stationary in the vertical direction (e.g., along the positive and negative Z-directions of the coordinate axis depicted in FIG. 6). Thermal expansion of the second connector tube 17 along the connector tube axis 610 may cause movement of the delivery vessel 18.

In embodiments, to facilitate such movement of the delivery vessel 18, the support structure 600 comprises a support mechanism 612 in contact with the delivery vessel 18. The support mechanism 612 may counteract a gravitational load associated with the delivery vessel 18 to prevent friction from inhibiting horizontal movement of the delivery vessel 18 in response to thermal expansion of the second connector tube 17. In embodiments, the support mechanism 612 comprises one or more elements configured to apply a force to the delivery vessel in the upward vertical direction to counteract the weight of the delivery vessel 18. For example, in embodiments, the support mechanism 612 comprises a plurality of spring assemblies, actuators, or pneumatic cylinders that are in contact with a support structure (e.g., support arms) that supports the delivery vessel 18. For example, in embodiments, the support structure 600 comprises a plurality of support arms (not depicted) that are movably coupled to a stationary reference of the glass manufacturing apparatus 10 and configured to move in conjunction with the support cart 608 in the horizontal direction (e.g., the plurality of support arms may extend from the support cart 608). In embodiments, the support mechanism 612 comprises a plurality of spring assemblies, actuators, or pneumatic cylinders that couple the plurality of support arms to the delivery vessel and apply forces in a vertically upward direction to counteract a weight of the delivery vessel 18. In embodiments, the support system comprises a counterweight pivotally coupled to the delivery vessel 18 via a pivot arm (not depicted). The counterweight may apply a downward force on a first end of the pivot arm to force a second end of the pivot arm coupled to the delivery vessel 18 upward. In embodiments, the support mechanism 612 comprises a support structure extending from a fixed reference point. Such a support structure may include a track or rail system that engages with features (e.g., rollers, extensions, etc.) of the delivery vessel 18 to vertically support the delivery vessel 18 while also permitting horizontal movement thereof. In embodiments, the support mechanism 612 comprises a movable hanger system that extends above the delivery vessel 18 and includes a plurality of hanger elements (e.g., support lines or other suitable structures) that engage with the delivery vessel 18.

As depicted in FIG. 6, the support structure 600 further comprises a stir chamber support cart 606. In embodiments, the stir chamber support cart 606 is fixedly attached within the reference frame of the glass manufacturing apparatus 10. In embodiments, the stir chamber support cart 606 is supported by the base 42 via a support structure 614 extending vertically between the base 42 and the stir chamber support cart 606.

In embodiments, the point of connection between the first connector tube 15 and the stir chamber 14 (e.g., via the entry port 128 depicted in FIG. 2C) is not fixed within the reference frame of the glass manufacturing apparatus 10 to permit thermal expansion of the stir chamber 14 in a vertically upward direction. That is, in contrast to being fixed proximate to the entry port 128 as in the support structure 100, the upper portion of the stir chamber 14 is permitted to move relative to the stir chamber support cart 606 to prevent inhibiting expansion of the stir chamber 14. The stir chamber support cart 606 is depicted to comprise a support arm 620 that is connected to the base 42 via the support structure 614 and an extension 622 extending from the support arm 620 to overlap the first assembly 602 supporting the first connector tube 15. In embodiments, the extension 622 is movable relative to the support arm 620 to prevent inhibiting vertical expansion of the stir chamber 14. In embodiments, the support arm 620 and the extension 622 are fixed to a reference of the glass manufacturing apparatus 10 via a plurality of assemblies 624. The assemblies 624 may be similar in structure to the pluralities of roller and track assemblies 222 and 224 described herein with respect to FIG. 2A to permit movement of the support arm 620 and/or extension arm 622 in response to thermal expansion and contraction of the components of the glass manufacturing apparatus 10.

To permit horizontal mobility of the delivery vessel 18, the stir chamber support cart 606 may not be fixedly attached to the delivery vessel 18. As depicted in FIG. 6, for example, an end 616 of the stir chamber support cart 606 is not directly attached to the delivery vessel 18 or the support cart 608. In embodiments, the second assembly 604 comprises a number of the features described herein with respect to the second assembly 106 of the support structure 100 described herein with respect to FIGS. 2A-5. For example, in embodiments, the second assembly 106 comprises the plurality of modules 300 that are connected to one another via the sliding joints 324 and 326 described herein with respect to FIG. 4 to prevent inhibition of expansion of the second connector tube 17 along the connector tube axis 610. In embodiments, the second assembly 604 comprises one or more expansion assists configured to apply a force and counteract resistance to expansion caused by the delivery vessel 18. For example, in embodiments, the second assembly 604 comprises an expansion assist similar to the expansion assist 400 described herein with respect to FIG. 5 (e.g., including a rod extending parallel to the connector tube axis 610 and a compressed spring). Such an expansion assist may extend between or connect the base 42 to a support frame 618 structurally supporting the second connector tube 17. The support frame 618 may be similar in structure to the second support frame 212 described herein with respect to FIGS. 2A-5 in various embodiments.

In embodiments, the structure of the stir chamber 14 may vary from that described above with respect to FIG. 2C as a result of the support structure 600. In embodiments, the drain tube 140 (see FIG. 2C) may be fixedly attached to the base 42 via a drain tube ring (not depicted). The fixation of the drain tube 140 may eliminate the need for the flange extensions 146 extending radially outward from the main body of the metallic vessel 126 described with respect to FIG. 2C. As a result, the manner with which the stir chamber 14 is supported via the stir chamber support cart 606 may vary from the embodiment described herein with respect to FIGS. 2A-2C. However, embodiments are envisioned where the support structure 600 comprises various aspects of the stir chamber support structure 118 described herein (e.g., the flange extensions 146, the spring assemblies 154, the stir chamber support members 120, etc.). In embodiments, for example, the support structure 600 may include the plurality of mass compensation members 170 described herein with respect to FIGS. 2A-2C to compensate for the mass of the stir chamber 14 and avoid expansion inhibition. Various combinations of various aspects the above described support structures are contemplated and within the scope of the present disclosure.

The support structures for the glass manufacturing apparatuses described herein may be structured to avoid inhibition of thermal expansion of the stir chamber and a connector tube extending between the stir chamber and a delivery vessel. The support structures described herein permit relative motion between the bottom portion of the stir chamber and the delivery vessel to avoid stress and strain accumulation at the bottom of the stir chamber and the connector tube. Such relative motion facilitates thermal expansions of the stir chamber and connector tube and avoids leaks and other potential failure modes.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass manufacturing apparatus comprising:

(A) a first assembly comprising (i) a first connector tube for receiving molten glass;

(ii) a stir chamber disposed on a base, the stir chamber comprising:

(a) an entry port attached to the first connector tube;

(b) a chamber conduit extending at least partially downward in a vertical direction away from the entry port; and (c) an elbow conduit comprising (1) a first portion in fluid communication with the chamber conduit to receive molten glass therefrom and (2) a second portion extending at an angle from the vertical direction to re-direct the molten glass flowing from the chamber conduit;

(B) a second assembly comprising:

(i) a second connector tube connected to the elbow conduit to deliver molten glass therefrom, wherein at least a portion of the second connector tube extends at least partially upward in the vertical direction; and (ii) a delivery vessel connected to the second connector tube, wherein:

one of the base or the delivery vessel is attached to a reference point that is fixed in the vertical direction;

the other one of the base or the delivery vessel is movable in response to thermal expansion of the second connector tube; and movement of the other one of the base or the delivery vessel responsive to thermal expansion of the second connector tube is independent of thermal expansion of the other one of the base or the delivery vessel; and (C) a support system in mechanical contact with the one of the base or the delivery vessel that is attached to the reference point, the support system counteracting a gravitational load associated with the one of the base or the delivery vessel to facilitate vertical expansion thereof away from the reference point upon heating.

2. The glass manufacturing apparatus of claim 1, further comprising a support structure attached to the reference point and structurally supporting the one of the base or the delivery vessel, wherein the support system comprises one or more spring assemblies extending between the one of the base or the delivery vessel and the support structure attached to the reference point.

3. The glass manufacturing apparatus of claim 1, wherein:
the delivery vessel is fixedly attached to the reference point, and
the glass manufacturing apparatus further comprises:
a stir chamber support cart extending in a horizontal direction between the second assembly and the first assembly,
a stir chamber support frame extending vertically from the base, the stir chamber support frame structurally supporting the stir chamber, and
one or more sliding joints coupling the stir chamber support frame to the stir chamber support cart such that the base moves in the vertical direction relative to the stir chamber support cart with expansion of the stir chamber.

4. The glass manufacturing apparatus of claim 3, further comprising a system configured to negate a weight of the stir chamber and permit vertical expansion of the stir chamber via application of a force to the stir chamber.

5. The glass manufacturing apparatus of claim 1, wherein the stir chamber comprises:
a metallic vessel forming the chamber conduit and the elbow conduit; and
a retainer structure encapsulating the metallic vessel.

6. The glass manufacturing apparatus of claim 5, wherein:
the metallic vessel comprises a flange disposed at an upper end of the stir chamber opposite the elbow conduit,
the stir chamber further comprises a plurality of flange extensions extending outward from the flange, and the plurality of flange extensions are connected to the reference point.

7. The glass manufacturing apparatus of claim 6, further comprising a plurality of expansion assists extending between the plurality of flange extensions and a support structure coupled to the first assembly, the plurality of expansion assists applying an upward force to the flange to assist expansion of a portion of the stir chamber.

8. The glass manufacturing apparatus of claim 5, wherein the stir chamber further comprises a refractory body surrounding the metallic vessel, the refractory body extending between the metallic vessel and the retainer structure.

9. The glass manufacturing apparatus of claim 8, wherein the retainer structure comprises:
a plurality of circumferential segments surrounding the metallic vessel;
a plurality of pressure bolt assemblies compressing the metallic vessel in a radially inward direction; and
a plurality of tension spring assemblies applying circumferential tension to the plurality of circumferential segments.

10. The glass manufacturing apparatus of claim 9, wherein the plurality of tension spring assemblies and the plurality of pressure bolts are disposed in a circumferentially alternating arrangement and configured to damp strain accumulation within the metallic vessel from thermal expansion of the second connector tube.

11. The glass manufacturing apparatus of claim 1, wherein the second connector tube comprises a flow axis extending in a third direction forming a non-zero acute angle with the vertical direction towards the delivery vessel.

* * * * *